(12) United States Patent
Rudd

(10) Patent No.: US 12,054,003 B2
(45) Date of Patent: Aug. 6, 2024

(54) VEHICLE HUB ATTACHMENT ADAPTOR AND ACCESSORIES THEREFOR

(71) Applicant: Antony Rupert John Rudd, South Perth (AU)

(72) Inventor: Antony Rupert John Rudd, South Perth (AU)

( * ) Notice: Subject to any disclaimer, the term of this patent is extended or adjusted under 35 U.S.C. 154(b) by 603 days.

(21) Appl. No.: 17/281,226

(22) PCT Filed: Sep. 26, 2019

(86) PCT No.: PCT/AU2019/051043
§ 371 (c)(1),
(2) Date: Mar. 29, 2021

(87) PCT Pub. No.: WO2020/069562
PCT Pub. Date: Apr. 9, 2020

(65) Prior Publication Data
US 2021/0394552 A1      Dec. 23, 2021

(30) Foreign Application Priority Data

Oct. 1, 2018   (AU) ................................ 2018903701

(51) Int. Cl.
*B60B 15/26*    (2006.01)
*B60B 7/06*     (2006.01)
*B60B 27/00*    (2006.01)

(52) U.S. Cl.
CPC ............ *B60B 15/263* (2013.01); *B60B 7/068* (2013.01); *B60B 27/0047* (2013.01); *B60B 2900/551* (2013.01)

(58) Field of Classification Search
CPC ....... B60B 7/068; B60B 15/26; B60B 15/263; B60B 27/0047; B60B 2900/551
See application file for complete search history.

(56) References Cited

U.S. PATENT DOCUMENTS

| 1,077,030 A | * | 10/1913 | Bean ..................... B66D 1/005 |
|||||242/392|
| 2,635,012 A | | 4/1953 | Rappaport |

(Continued)

FOREIGN PATENT DOCUMENTS

| AU | 2005229160 B2 | 10/2005 |
| AU | 2016900997 | 9/2017 |

(Continued)

OTHER PUBLICATIONS

International Search Report, mailing date Oct. 28, 2019 for corresponding International Application No. PCT/AU2019/051043 (pp. 1 to 6).

(Continued)

*Primary Examiner* — S. Joseph Morano
*Assistant Examiner* — Emily G. Castonguay
(74) *Attorney, Agent, or Firm* — Intellectual Property Law Group LLP

(57) ABSTRACT

Wheel hub adaptor (11) attachable to vehicle wheel to attach vehicle accessory for rotation with vehicle wheel, has an inner mounting plate (15) with recesses or apertures (17) to match a vehicle wheel stud pattern, a body (19) extending from the plate (15) to an outer mounting plate (27) having a mount to which the vehicle accessory attaches. The mount has apertures (65) which align with studs (75) on a mating mount of the vehicle accessory. The inner mounting plate and the outer mounting plate mount to the vehicle wheel and vehicle accessory respectively, by rotating apertures (17 65) to stop portions (35 71), and is secured by a bolt passing through one of two circular apertures (43 45) or (67 69). Vehicle accessories can be provided like a paddle to self-propel the vehicle in sand, and a wheel to widen the vehicle track.

18 Claims, 17 Drawing Sheets

(56) References Cited

U.S. PATENT DOCUMENTS

| | | | |
|---|---|---|---|
| 2,714,042 A | | 7/1955 | Kelly |
| 3,128,128 A | | 4/1964 | Jines |
| 4,007,968 A | | 2/1977 | Solis |
| 4,333,688 A | | 6/1982 | Lemmon et al. |
| 4,387,930 A | | 6/1983 | Hunt |
| 4,576,214 A | * | 3/1986 | Preusker ............... B60C 27/045 |
| | | | 152/213 A |
| 4,818,031 A | * | 4/1989 | Brown .................... B60B 11/02 |
| | | | 301/36.1 |
| 5,156,695 A | * | 10/1992 | Martin .................... B60C 27/04 |
| | | | 152/216 |
| 2004/0119329 A1 | * | 6/2004 | Rudolf .................... B60B 11/02 |
| | | | 301/36.1 |
| 2013/0234496 A1 | | 9/2013 | Gengerke |
| 2015/0123453 A1 | | 5/2015 | Wayne |
| 2019/0039865 A1 | | 2/2019 | Verbeek |

FOREIGN PATENT DOCUMENTS

| | | |
|---|---|---|
| CA | 3017968 A1 | 9/2017 |
| GB | 1086940 A | 10/1967 |
| WO | WO 2017/156571 A1 | 9/2017 |

OTHER PUBLICATIONS

Written Opinion of the ISA, mailing date Oct. 28, 2019 for corresponding International Application No. PCT/AU2019/051043 (pp. 1 to 9).

* cited by examiner

FIGURE 6
FIGURE 11
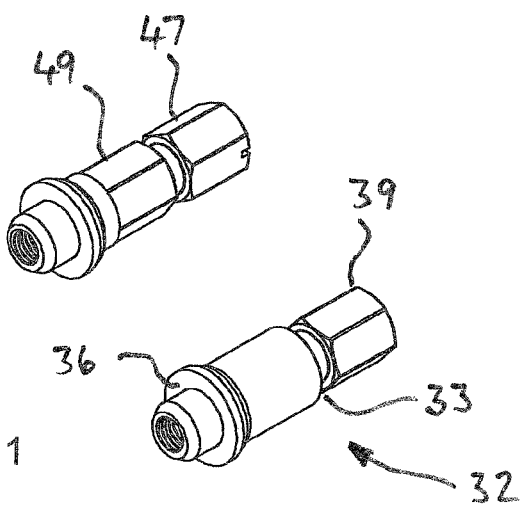
FIGURE 7
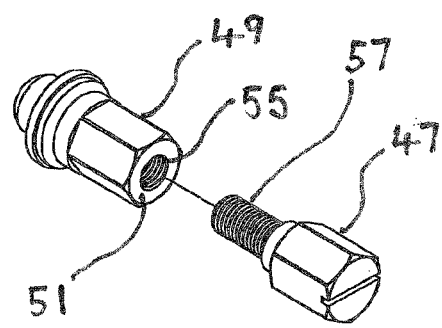
FIGURE 8
FIGURE 12
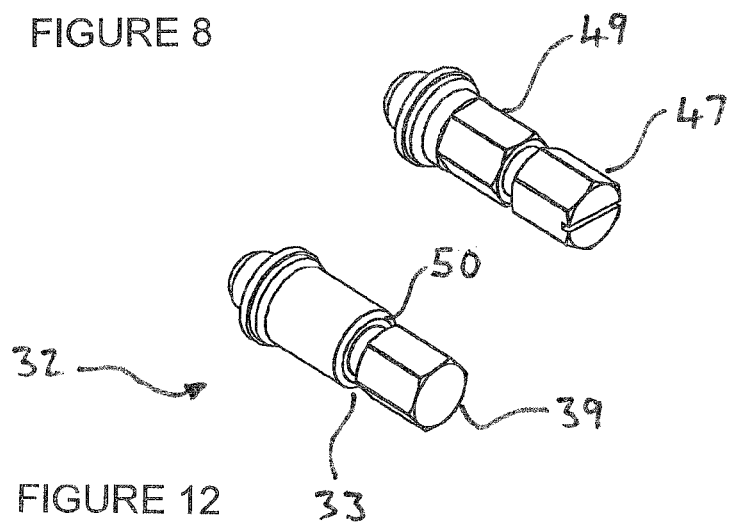

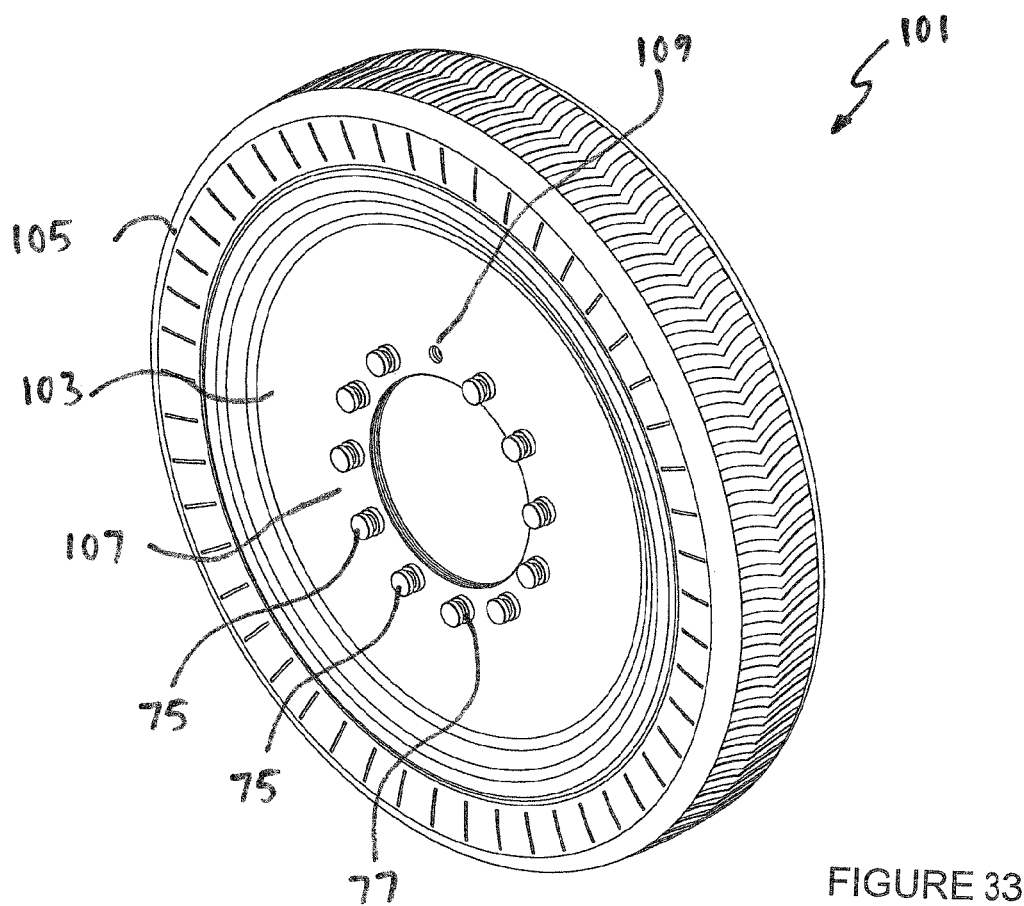
FIGURE 33
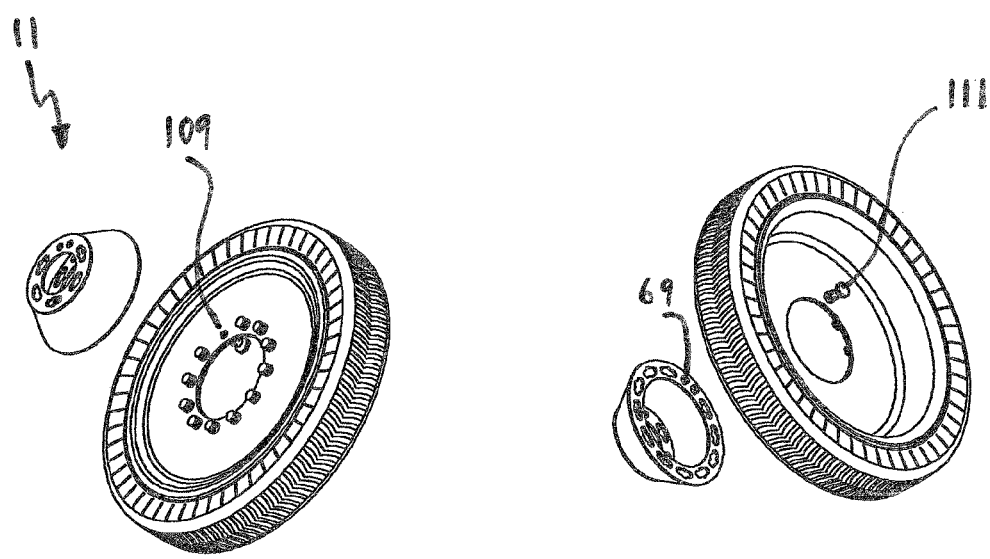
FIGURE 34
FIGURE 35

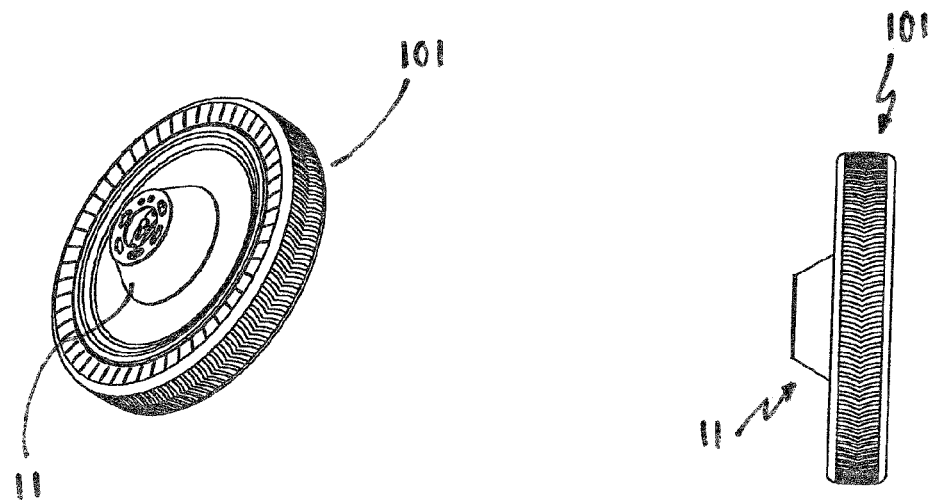
FIGURE 36
FIGURE 37
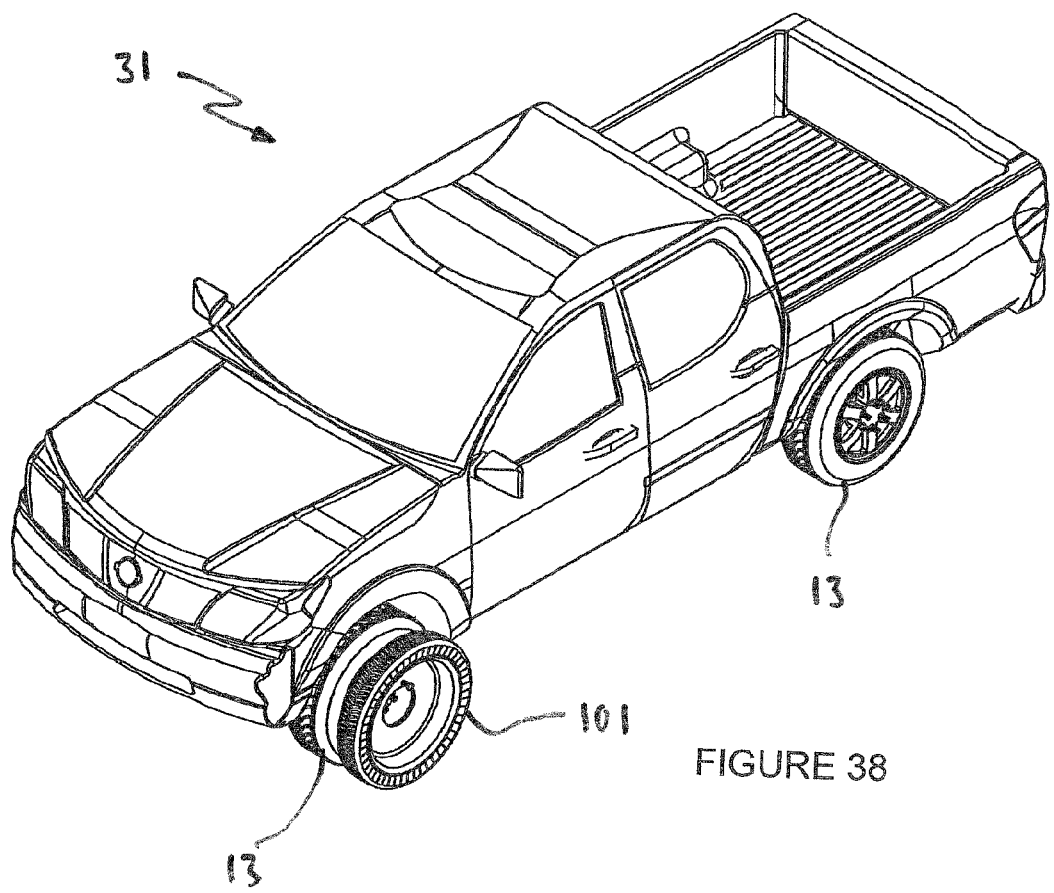
FIGURE 38

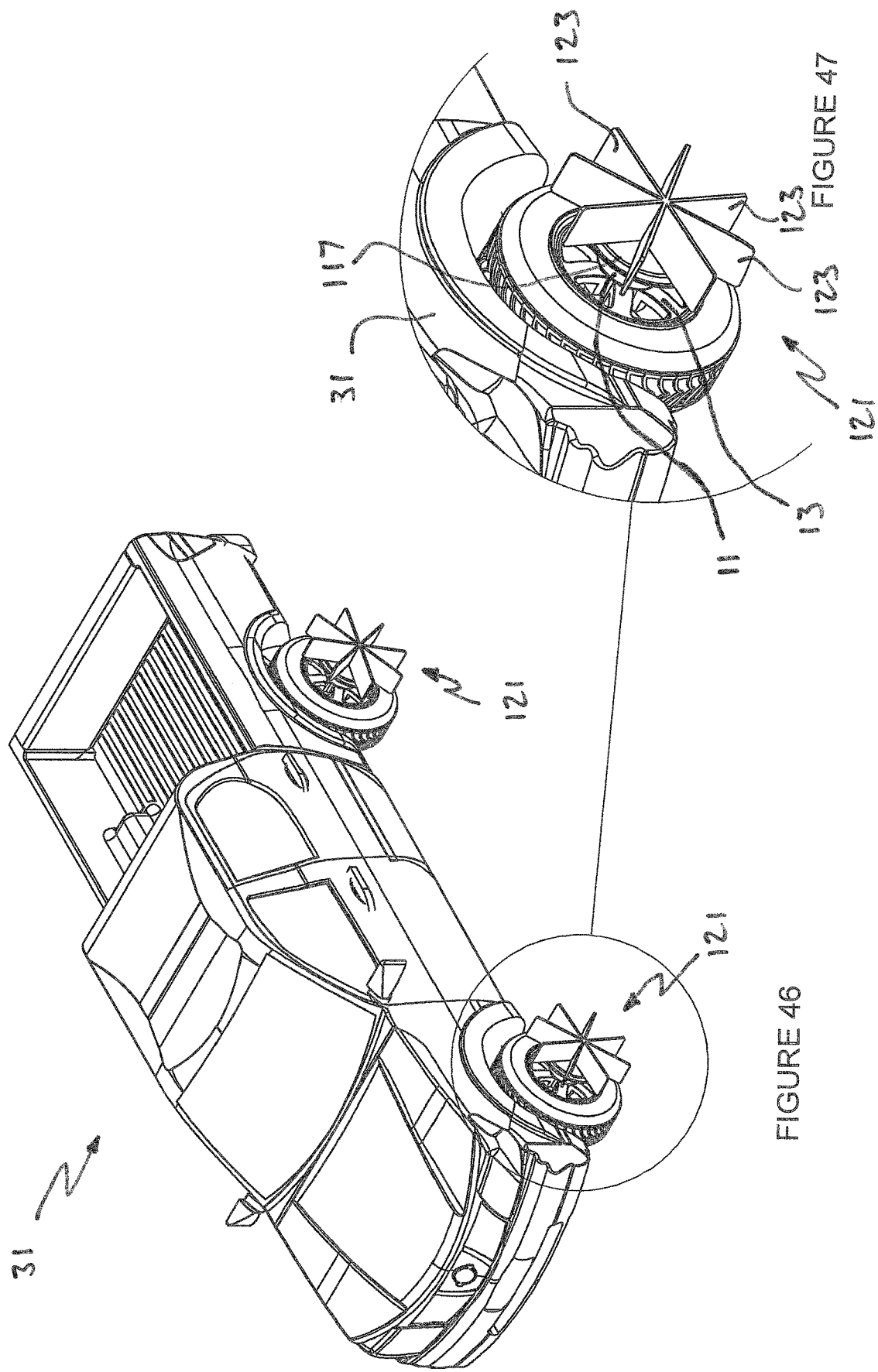

VEHICLE HUB ATTACHMENT ADAPTOR AND ACCESSORIES THEREFOR

CROSS-REFERENCE TO RELATED APPLICATIONS

This application is a U.S. National Phase application, under 35 U.S.C. § 371, of International Application no. PCT/AU2019/051043, with an international filing date of Sep. 26, 2019, and claims benefit of Australian Application no. 2018903701 filed on Oct. 1, 2018, each of which is hereby incorporated by reference for all purposes.

TECHNICAL FIELD

This invention relates to vehicle accessories, and in particular to an adaptor to attach to the hub of a vehicle wheel for rotation therewith in order to derive tractive effort from rotation of the vehicle wheel. This invention is scalable to all sized vehicles including trucks, but has particular but not exclusive application as an accessory for four wheel drive vehicles.

BACKGROUND ART

The following discussion of the background art is intended to facilitate an understanding of the present invention only. It should be appreciated that the discussion is not an acknowledgement or admission that any of the material referred to was part of the common general knowledge as at the priority date of the application.

Vehicles, both two wheel drive and four wheel drive, can encounter difficult terrain from extremely soft surfaces such as sand, where the vehicle sinks into it and becomes bogged with the vehicle chassis grounded, resulting in loss of traction, extremely slippery surfaces which result in a loss of traction, and deeply rutted tracks where the ruts are so deep that the vehicle chassis becomes grounded, also resulting in a loss of traction. Any of these instances can result in a vehicle becoming stranded.

Traditional methods used to recover stranded wheeled vehicles focus on two main approaches of gaining improved grip from the vehicle tyres, and using sources external to the vehicle. Gaining improved grip from the vehicle tyre is typically achieved by lowering tyre pressure, increasing the tyre's footprint and, spreading the vehicle's weight over a larger surface area. Additional grip can be provided by introducing short lengths of tracking in front of the tyre and driving the wheels onto the tracking. Other sources external to the vehicle may involve the utilisation of a second vehicle towing the stranded vehicle out via a connected rope or strap, or using a winching device connecting a fixed anchor point to free the stranded vehicle.

Throughout the specification unless the context requires otherwise, the word "comprise" or variations such as "comprises" or "comprising", will be understood to imply the inclusion of a stated integer or group of integers but not the exclusion of any other integer or group of integers.

It is an object of the present invention to provide an arrangement for a vehicle that can assist in overcoming traction issues in vehicles.

SUMMARY OF INVENTION

In accordance with one aspect of the invention, there is provided a wheel hub adaptor to attach to a vehicle wheel to attach a vehicle accessory for rotation with said vehicle wheel, said wheel hub adaptor having an inner mounting plate having a plurality of recesses or apertures to match a wheel stud pattern of a wheel for a vehicle with which said adaptor is to be employed, a structural body extending from said inner mounting plate from a side thereof opposite to said wheel, to an outer mounting plate, said outer mounting plate being securable with said vehicle accessory in order to mount the vehicle accessory to the wheel hub adaptor; wherein the outer mounting plate has a mount to attach said vehicle accessory, said vehicle accessory having a mating mount to attach to said mount; wherein the mount comprises a plurality of spaced apart mount apertures being slot shaped with an end portion at opposed ends thereof, and with a stud clearance void located substantially equidistant from said opposed end portions; said mating mount comprising a plurality of studs aligned with said stud clearance voids, each of said studs having a circumferential stepped recess to receive a said slot portion of a said mount aperture when locking said vehicle accessory to said outer mounting plate; and wherein the mount features two spaced apart circular threaded apertures, and the mating mount features a single aperture, where said single aperture will align with one of said threaded apertures at extremes of rotation of said mating mount relative to said mount, and a threaded fastener is provided to secure said single aperture to one of said two spaced apart apertures, to secure said vehicle accessory to said wheel hub adaptor.

By way of explanation the structural body extends from the side of the inner mounting plate away from the wheel. The opposite side to said side of the inner mounting plate contacts the wheel. The structural body spaces the outer mounting plate away from the inner mounting plate, away from the wheel.

A wheel hub adaptor according to the invention is intended to be mounted to at least two opposed wheels of a four wheel drive vehicle, so that the vehicle accessory can be readily fitted to the outer mounting plate, when required. The wheel hub adaptor is fitted when the driver of the vehicle anticipates tackling some difficult terrain, and is fitted prior to negotiating the difficult terrain and removed after the terrain has been negotiated. Typical vehicle accessories include paddles for sand traction, drums for a winch, or an additional wheel in order to provide greater wheel width for better traction. Further applications will be understood from the description of the embodiment. A range of vehicle accessories can be provided as a kit, for the driver to fit to the hub adaptor, as required.

Preferably said inner mounting plate of said wheel hub adaptor is arranged to engage with a plurality of fasteners each provided with a circumferential groove having a radial depth sufficient to provide purchase to stop portions of said mounting plate. The fasteners are intended to replace the wheel nuts or bolts used to secure the vehicle wheel to its hub. The circumferential grooves in the fasteners are spaced at a distance from the seat of the fastener by which the vehicle wheel is pinned to the hub, so that the inner mounting plate stop portions can engage with the circumferential grooves. This allows clearance for any hub centre that the wheel or hub may have, that needs to be accommodated within the inner mounting plate, between the recesses or apertures in the inner mounting plate.

Preferably the inner mounting plate has said recesses or apertures arranged with a clearance void to accommodate passage of said fasteners, to allow the fitting or removal of said wheel hub adaptor. The wheel hub adaptor is fitted by aligning the clearance voids with the fasteners, inserting the wheel hub adaptor along the fasteners so that the inner mounting plate fastener engaging portions reach the circumferential grooves, and then rotating the wheel hub adaptor to lock it in position against the stop portions. The action of locking in position can be likened to a bayonet mount. The direction that the wheel hub adaptor is rotated relative to the vehicle wheel is dictated by the direction that the wheel hub adaptor will be loaded when the vehicle is under power. Thus for a vehicle moving forward, to lock the wheel hub adaptors in position, wheel hub adaptors on the right side of the vehicle would be rotated counter-clockwise, and wheel hub adaptors on the left side of the vehicle would be rotated clockwise. In other words, the hub adaptor is always rotated in the opposite direction to the intended direction of travel of the vehicle.

Preferably the inner mounting plate has said recesses or apertures arranged in the form of slot shaped apertures each with a stop portion at opposed ends thereof, with said clearance void located substantially equidistant from said opposed stop portions of each said slot shaped aperture to accommodate passage of said fasteners, to allow the fitting or removal of said wheel hub adaptor. The wheel hub adaptor is fitted by aligning the clearance voids with the fasteners, inserting the wheel hub adaptor along the fasteners so that the inner mounting plate fastener engaging portions reach the circumferential grooves, and then rotating the wheel hub adaptor to lock it in position against a said stop portion. For each slot shaped aperture, a portion of the slot slidingly engages with the circumferential groove of a fastener, until the slot shaped aperture reaches the stop portion, against which it is restrained. As with the previously described arrangement, the action of locking in position can be likened to a bayonet mount. Also as with the previously described arrangement, the direction that the wheel hub adaptor is rotated relative to the vehicle wheel is dictated by the direction that the wheel hub adaptor will be loaded when the vehicle is under power. Thus for a vehicle moving forward, to lock the wheel hub adaptors in position, wheel hub adaptors on the right side of the vehicle would be rotated counter-clockwise, and wheel hub adaptors on the left side of the vehicle would be rotated clockwise. In other words, the hub adaptor is always rotated in the opposite direction to the intended direction of travel of the vehicle.

Preferably the inner mounting plate features two spaced apart circular apertures arranged to receive a threaded bolt which passes through one said circular aperture, to secure to a second fastener, said second fastener having a length equal to the length from the inner face of said grooves of said plurality of fasteners, said second fastener having a female thread to mate with said bolt. When the wheel hub adaptor is rotated to lock it in position, one of the circular apertures will align with the female thread of the second fastener, so that the bolt can pass through to secure the wheel hub adaptor to the wheel of the vehicle. With this arrangement for a vehicle having n wheel studs or wheel bolts, there will be n−1 fasteners with a circumferential groove, one second fastener, and one bolt, for each wheel of the vehicle.

Preferably the outer mounting plate has a mount to attach said vehicle accessory, said vehicle accessory having a mating mount to attach to said mount. A simple way to attach the vehicle accessory to the outer mounting plate would be by bolts that attach to pre-tapped apertures in the outer mounting plate or by nuts attaching to studs secured to the outer mounting plate that pass through the vehicle accessory. However, for greater convenience, the arrangement of the connection between the mount and the mating mount may be configured according to the same concept as that of the inner mounting plate attachment to the vehicle wheel. In other words, one of the mount and the mating mount comprises a plurality of spaced apart mount apertures being slot shaped with an end portion at opposed ends thereof, and with a stud clearance void located substantially equidistant from said opposed end portions; and the other of the mating mount and the mount comprises a plurality of studs aligned with said stud clearance voids, each of said studs having a circumferential stepped recess to receive a said slot portion of a said mount aperture when locking said vehicle accessory to said outer mounting plate.

In a most preferred feature of the invention the mount comprises a plurality of spaced apart mount apertures being slot shaped with an end portion at opposed ends thereof, and with a stud clearance void located substantially equidistant from said opposed end portions; said mating mount comprising a plurality of studs aligned with said stud clearance voids, each of said studs having a circumferential stepped recess to receive a said slot portion of a said mount aperture when locking said vehicle accessory to said outer mounting plate.

The vehicle accessory is fitted to the outer mounting plate by aligning the studs with the stud clearance voids, inserting the vehicle accessory along the studs so that the circumferential stepped recesses meet the slots in the mount apertures, and then rotating the vehicle accessory to lock it in position against a said end portion. For each mount aperture, a portion of the slot slidingly engages with a said circumferential stepped recess of a said stud, until the slot reaches the end portion, against which it is restrained. As with the previously described arrangement, the action of locking in position can be likened to a bayonet mount. Also as with the previously described arrangement, the direction that the vehicle accessory is rotated relative to the wheel hub adaptor and vehicle wheel is dictated by the direction that the vehicle accessory will be loaded when the vehicle is under power. Thus for a vehicle moving forward, to lock the vehicle accessory in position, vehicle accessories on the right side of the vehicle would be rotated counter-clockwise, and vehicle accessories on the left side of the vehicle would be rotated clockwise. In all cases, the direction of the accessory to the hub assembly and the direction of rotation of the hub assembly itself, is always the same direction.

Preferably the mount features two spaced apart circular threaded apertures, and the mating mount features a single aperture, where said single aperture will align with one of said threaded apertures at extremes of rotation of said mating mount relative to said mount, and a threaded fastener is provided to secure said single aperture to one of said two spaced apart apertures, to secure said vehicle accessory to said wheel hub adaptor. When the vehicle accessory is rotated to lock it in position, one of the two threaded apertures will align with the single aperture of the vehicle accessory.

Preferably the mount features two further spaced apart circular threaded apertures located diametrically opposite said two spaced apart circular threaded apertures, and the mating mount features a single further aperture located diametrically opposite said single aperture, where said single further aperture will align with one of said two further spaced apart circular threaded apertures at extremes of rotation of said mating mount relative to said mount, and a threaded fastener is provided to secure said single further aperture to one of said two further spaced apart apertures, to secure said vehicle accessory to said wheel hub adaptor.

In accordance with a second aspect of the invention there is provided a wheel hub adaptor to attach to a vehicle wheel to attach a vehicle accessory for rotation with said vehicle wheel, said wheel hub adaptor having an inner mounting plate having a plurality of elongate recesses or apertures having a centrally located clearance void to match a wheel stud pattern of said vehicle wheel for a vehicle with which said adaptor is to be employed and to allow passage of fasteners therethrough, said elongate recesses or apertures having a stop portion at each end thereof opposed from said clearance void; said wheel hub adaptor having a structural body extending from said inner mounting plate from a side thereof opposite to said wheel, to an outer mounting plate, said outer mounting plate being securable with said vehicle accessory in order to mount the vehicle accessory to the wheel hub adaptor; wherein said inner mounting plate of said wheel hub adaptor is arranged to engage with a plurality of fasteners used to secure said vehicle wheel, each of said fasteners being provided with a circumferential groove having a radial depth sufficient to accommodate at least a part of said elongate recesses or apertures and to provide purchase to a said stop portion; wherein the inner mounting plate features two spaced apart circular apertures arranged to receive a threaded bolt which at extremes of rotation of said wheel hub adaptor relative to said vehicle wheel passes through one said circular aperture, to secure to a second fastener, said second fastener being used to secure said vehicle wheel and having an axial length equal to the length from the inner face of said grooves of said plurality of fasteners, said second fastener having a female thread to mate with said bolt. The wheel hub adaptor is fitted by aligning the clearance voids with the fasteners, inserting the wheel hub adaptor along the fasteners so that the inner mounting plate fastener engaging portions reach the circumferential grooves, and then rotating the wheel hub adaptor to lock it in position against the stop portions. The action of locking in position can be likened to a bayonet mount. The direction that the wheel hub adaptor is rotated relative to the vehicle wheel is dictated by the direction that the wheel hub adaptor will be loaded when the vehicle is under power. Thus, for a vehicle moving forward, to lock the wheel hub adaptors in position, wheel hub adaptors on the right side of the vehicle would be rotated counter-clockwise, and wheel hub adaptors on the left side of the vehicle would be rotated clockwise. In other words, the hub adaptor is always rotated in the opposite direction to the intended direction of travel of the vehicle.

Preferably the inner mounting plate has said recesses or apertures arranged in the form of slot shaped apertures each with a said stop portion at opposed ends thereof, with said clearance void located substantially equidistant from said opposed stop portions of each said slot shaped aperture to accommodate passage of said fasteners, to allow the fitting or removal of said wheel hub adaptor.

Preferably the inner mounting plate features two further spaced apart circular apertures located diametrically opposite said two spaced apart circular apertures and arranged to receive a further threaded bolt which passes through one said circular aperture, to secure to a further second fastener, said further second fastener being used to secure said vehicle wheel and having a length equal to the length from the inner face of said grooves of said plurality of fasteners, said second fastener having a female thread to mate with said bolt.

Preferably the outer mounting plate has a mount to attach said vehicle accessory, said vehicle accessory having a mating mount to attach to said mount.

Preferably the mount comprises a plurality of spaced apart mount apertures being slot shaped with an end portion at opposed ends thereof, and with a stud clearance void located substantially equidistant from said opposed end portions; said mating mount comprising a plurality of studs aligned with said stud clearance voids, each of said studs having a circumferential stepped recess to receive a said slot portion of a said mount aperture when locking said vehicle accessory to said outer mounting plate.

Preferably the mount features two spaced apart circular threaded apertures, and the mating mount features a single aperture, where said single aperture will align with one of said threaded apertures at extremes of rotation of said mating mount relative to said mount, and a threaded fastener is provided to secure said single aperture to one of said two spaced apart apertures, to secure said vehicle accessory to said wheel hub adaptor.

Preferably the mount features two further spaced apart circular threaded apertures located diametrically opposite said two spaced apart circular threaded apertures, and the mating mount features a single further aperture located diametrically opposite said single aperture, where said single further aperture will align with one of said two further spaced apart circular threaded apertures at extremes of rotation of said mating mount relative to said mount, and a threaded fastener is provided to secure said single further aperture to one of said two further spaced apart apertures, to secure said vehicle accessory to said wheel hub adaptor.

In accordance with a preferred feature of either aspect of the invention, said inner mounting plate has an annular configuration.

Preferably said structural body is cylindrical in configuration, attaching to or near an outer circumference of said inner mounting plate.

Preferably said outer mounting plate has an annular configuration.

Preferably said outer mounting plate has a larger diameter than said inner mounting plate.

Preferably said structural body is frusto-conical in configuration and a narrower diameter thereof attaches to or near an outer circumference of said inner mounting plate, and a wider diameter thereof attaches to or near an outer circumference of said outer mounting plate. In this manner the recesses and fasteners/studs that they receive are enclosed by the structural body, which minimizes the risk of impact with foreign material which may cause difficulty with disengaging the vehicle accessory from the wheel hub adaptor or the wheel hub adaptor from the vehicle wheel.

Also in accordance with the present invention, there is provided a vehicle accessory in the form of a paddle arrangement having a plurality of paddles located circumferentially around a hub, said hub being securable to the outer mounting plate of the wheel hub adaptor as hereinbefore described.

Also in accordance with the present invention, there is provided a vehicle accessory in the form of a paddle arrangement having a plurality of paddles located circumferentially around a hub, said hub having a said mating mount as hereinbefore described located radially thereon at one end thereof.

Additionally, in accordance with the invention, there is provided a vehicle accessory in the form of a winch having a reel with spaced radial sides within which a cable is secured, said reel having a said mating mount as hereinbefore described located radially thereon at one end thereof.

Still further, in accordance with the invention there is provided a vehicle accessory in the form of an additional wheel, said additional wheel being securable to the outer mounting plate of the wheel hub adaptor as hereinbefore described.

Still further, in accordance with the invention there is provided a vehicle accessory in the form of an additional wheel having a said mating mount as hereinbefore described located radially thereon.

Preferably the additional wheel includes a tyre, and is of overall diameter the same as the vehicle wheel to which the wheel hub adaptor is attached. This arrangement allows a temporary fitting to wheels of a vehicle which increases the overall wheel width, which can be useful in traversing soft sand or slippery surfaces.

Preferably the additional wheel is of overall diameter of from half to one sixth of the diameter of the vehicle wheel to which the hub adaptor is attached and has a width greater than its diameter. This arrangement allows a temporary fitting to wheels of a vehicle which can assist the vehicle in traversing deeply rutted tracks. The additional wheel extends beyond the ruts and contacts higher ground on the outside of the ruts, affording continued traction to the vehicle in a situation where the vehicle might otherwise lose traction and bottom out.

In the aforementioned arrangement, preferably the additional wheel comprises a cylindrical body, preferably of metal construction. The cylindrical body may advantageously be provided with an uneven surface, which may be in the form of corrugations which can extend axially or obliquely.

In an alternative preferred arrangement the cylindrical body is a metal cylinder attached to the mating mount and sharing a common axis therewith, and the uneven surface is provided by wear studs of the type utilized in earthmoving shovels, which are welded to the metal cylinder.

BRIEF DESCRIPTION OF DRAWINGS

A number of preferred embodiments of the invention will now be described in the following descriptions made with reference to the drawings, in which:

FIGS. 6 to 10 are views of a two-part fastener intended to be employed to attach a vehicle wheel hub adaptor according to either embodiment;

FIGS. 11 to 13 are views of a unitary (single part construction) fastener intended to be employed to attach a vehicle wheel hub adaptor according to either embodiment;

FIG. 33 is a perspective view of a vehicle accessory according to a second embodiment, being an additional wheel which is fitted to a vehicle hub adaptor;

FIGS. 34 to 37 are various views of the additional wheel of FIG. 33 and vehicle hub adaptor;

FIG. 38 is a perspective view showing the arrangement in FIG. 33, in use;

FIG. 46 is a perspective view showing the fourth embodiment illustrated in FIGS. 44 and 45, in use; and FIG. 47 is a close up of detail of part of FIG. 46.

DESCRIPTION OF EMBODIMENTS

Figure 1:
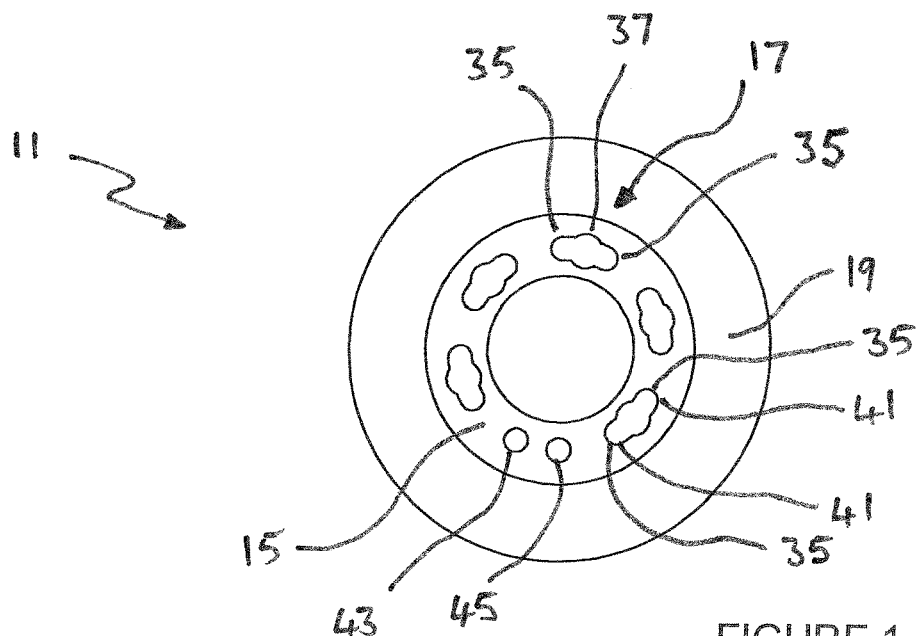
FIG. 1 is a rear plan view of a vehicle wheel hub adaptor according to the first embodiment.
Figure 2:
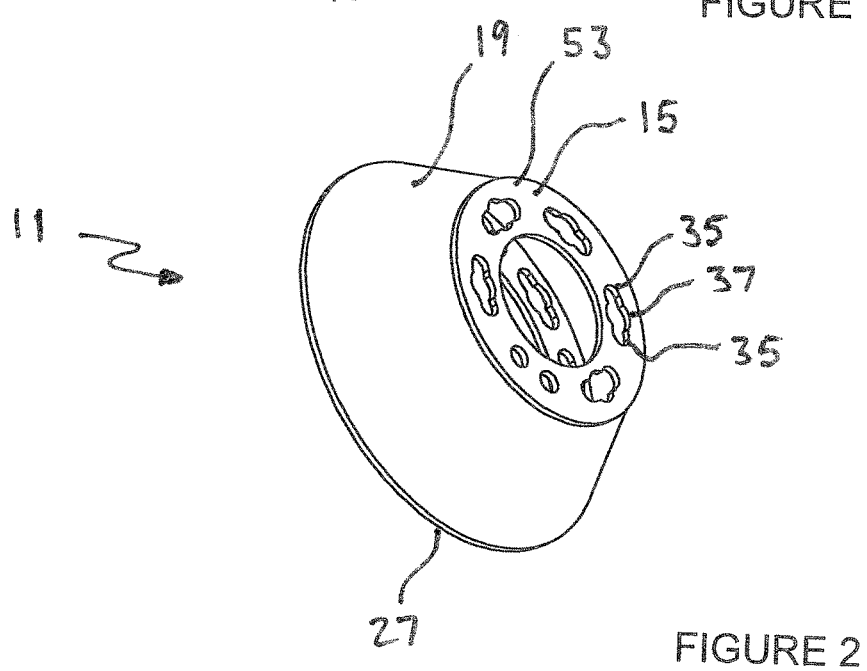
FIG. 2 is a rear perspective view of the vehicle wheel hub adaptor of FIG. 1.
Figure 3:
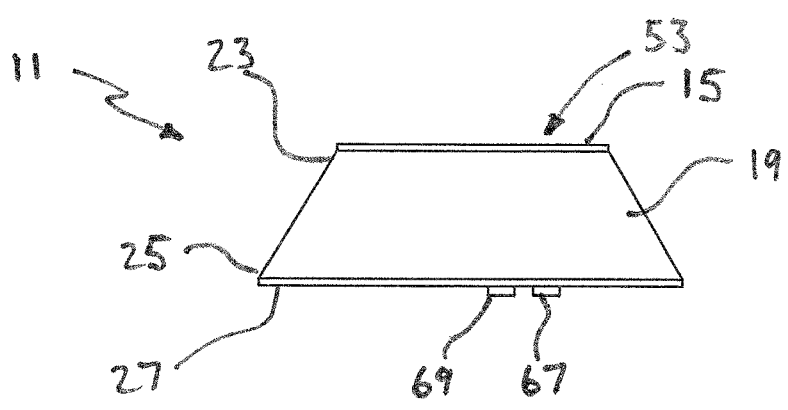
FIG. 3 is a side view of the vehicle wheel hub adaptor of FIG. 1.
Figure 5:
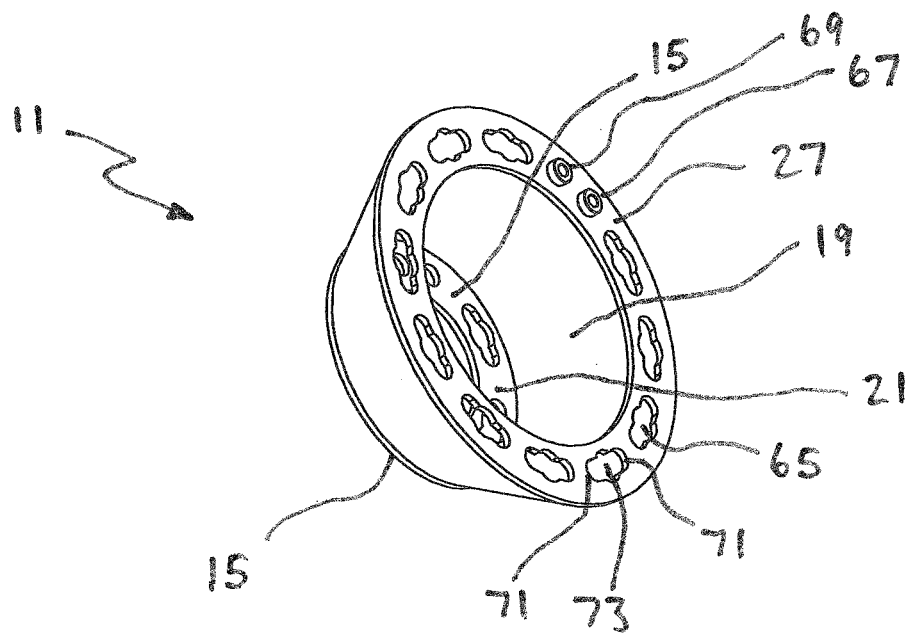
FIG. 5 is a front perspective view of the vehicle wheel hub adaptor of FIG. 1.

According to the embodiments, the invention provides a wheel hub adaptor indicated generally at 11 in FIGS. 1 to 5, to attach to a vehicle wheel 13. A vehicle accessory of various types may be attached to the wheel hub adaptor 11. When attached to the vehicle wheel 13, the wheel hub adaptor 11 rotates with the vehicle wheel 13, and any accessory attached to the wheel hub adaptor 11 will also rotate with the vehicle wheel 13.

The wheel hub adaptor 11 has an inner mounting plate 15 of annular configuration with a plurality of recesses or apertures 17 to match a wheel stud pattern of the vehicle wheel 13 which the hub adaptor is to be employed. Fillet welded to the inner mounting plate 15 so as to form a unitary structure, is a structural body in the form of a frustro-conical body 19 extending from said inner mounting plate 15 from a side 21 thereof opposite to the vehicle wheel 13 (so as to extend externally away from the vehicle wheel 13). The narrow circumference 23 of the frustro-conical body 19 attaches to the inner mounting plate 15 by a continuous fillet weld. In an alternative embodiment, the inner mounting plate 15 and frustroconical body may be cast or forged, and subsequently machined as necessary.

Attached to the wider circumference 25 of the frustroconical body 19 by a continuous fillet weld extending therearound, is an outer mounting plate 27, also of annular configuration. As will be explained, the outer mounting plate 27 is arranged to be securable with one of a number of different vehicle accessories, in order to mount the vehicle accessory to the hub adaptor 11.

By way of explanation the structural body 19 extends from the side 21 of the inner mounting plate 15 away from the vehicle wheel 13. The opposite side 29 of the inner mounting plate 15, to the side 21 of the inner mounting plate 15 faces the vehicle wheel 13. The structural body 19 spaces the outer mounting plate 27 away from the inner mounting plate 15, and away from the vehicle wheel 13.

A wheel hub adaptor 11 according to the invention is intended to be mounted to at least two opposed wheels 13 of a four wheel drive vehicle 31, so that the vehicle accessory can be readily fitted to the outer mounting plate 27, when required. The wheel hub adaptor 11 is fitted when the driver of the vehicle 31 anticipates tackling some difficult terrain, and is fitted prior to going off road. Typical vehicle accessories include paddles for sand traction, drums for a winch, or an additional wheel in order to provide greater wheel width for better traction. Further applications will be understood from the following description of the embodiment. A range of vehicle accessories can be provided as a kit, for the driver to fit, as required.

Figure 16:
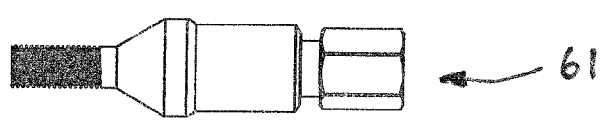
FIG. 16 is a view of an alternative unitary (single part construction) fastener intended to be employed to attach a vehicle wheel hub adaptor according to either embodiment.
Figure 17:
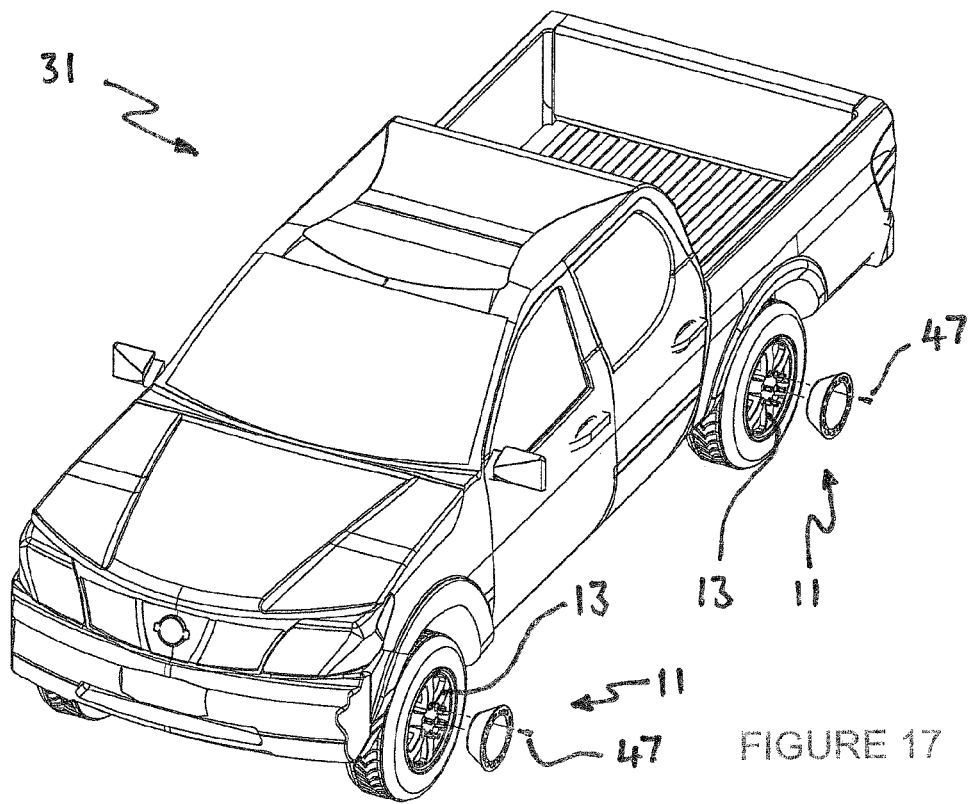
FIG. 17 is a perspective view showing a vehicle with unitary fasteners and the base part of a two part fastener substituted for the factory wheel nuts to secure the front and rear wheels to the hubs of the vehicle, for use with the embodiments, and showing two vehicle hub adaptors being presented in the process of being fitted to the vehicle.
Figure 18:
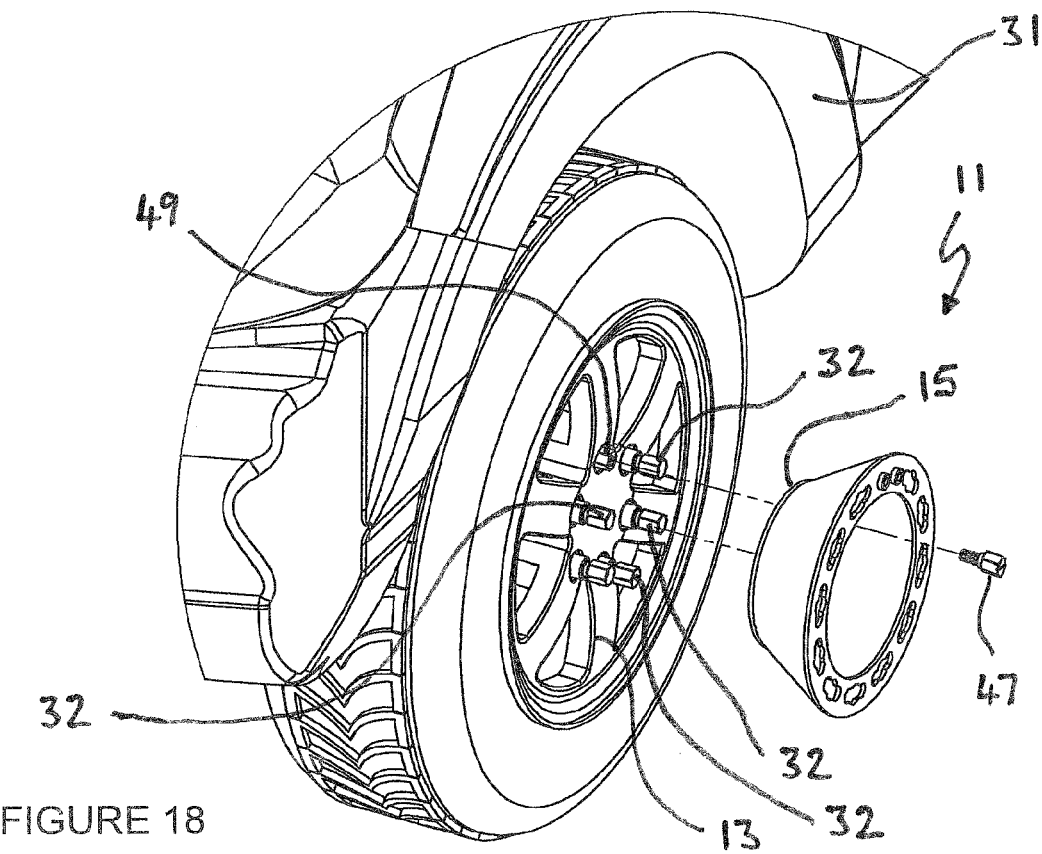
FIG. 18 is a close-up view of part of FIG. 17.
Figure 19:
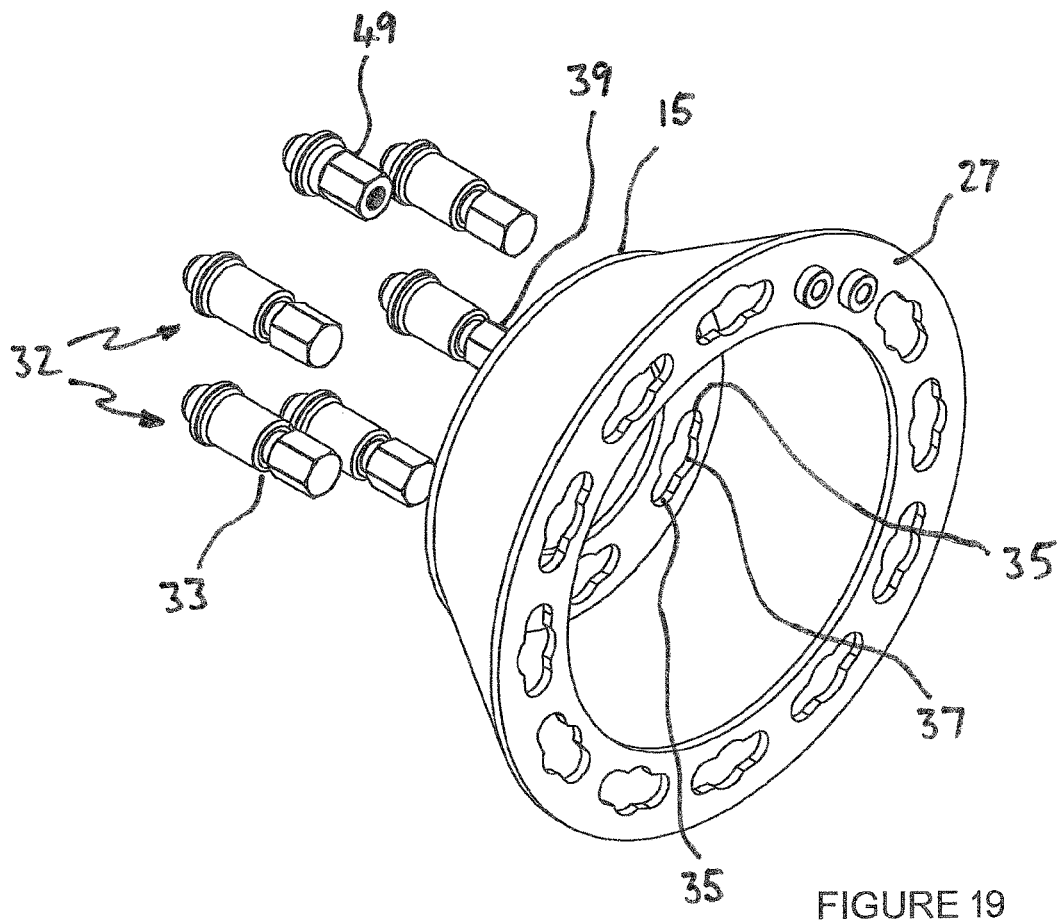
FIGS. 19 and 20 are close up views of detail showing one of the vehicle hub adaptors being presented to be fitted to the vehicle.

The inner mounting plate 15 of the wheel hub adaptor 11 is arranged to engage with a plurality of fasteners 32 as shown in FIGS. 11 to 13 or FIG. 16, each provided with a circumferential groove 33 having a radial depth sufficient to provide purchase to stop portions 35 of the inner mounting plate 15. The fasteners 32 are intended to replace the wheel nuts used to secure the vehicle wheel 13 to its hub, as illustrated in FIGS. 17 and 18. One fewer fasteners 32 are used to secure the wheel 13 to the vehicle 31, than the original number of wheel nuts that were employed to secure the vehicle wheel 13 to the vehicle, leaving one stud free, for reasons which will become clear.

The circumferential grooves 33 in the fasteners are spaced at a distance from the seat 36 of the fastener by which the vehicle wheel 13 is pinned to the hub, so that the inner mounting plate stop portions can engage with the circumferential grooves 33. This allows clearance for any hub centre that the wheel 13 or hub may have, that needs to be accommodated within the inner mounting plate 15, between the recesses or apertures 17 in the inner mounting plate 15. It will be understood that different vehicles will have different requirements for spacing of the circumferential grooves 33 from the seat of the fastener.

The apertures 17 each have a circular clearance void 37 to accommodate passage of heads 39 of the fasteners 32, to allow the fitting or removal of the wheel hub adaptor 11. The wheel hub adaptor 11 is fitted by aligning the clearance voids 37 with the fasteners 32, inserting the wheel hub adaptor 11 over the heads 39 of the fasteners 32 so that the heads 39 of the fasteners 32 pass through the clearance voids 37 until the narrowed portions of the apertures 17 that form the stop portions 35 line up with the circumferential groove 33 along the fasteners 32. Once in this position, the wheel hub adaptor 11 is rotated so that one of the narrowed parts 41 of the apertures 17 that form the stop portions 35 engages in the circumferential grooves 33, and locks in position against the stop portions 35. The direction that the wheel hub adaptor 11 is rotated relative to the vehicle wheel 13 is dictated by the direction that the wheel hub adaptor 11 will be loaded when the vehicle 31 is under power. Thus for a vehicle 31 moving forward, to lock the wheel hub adaptors in position, wheel hub adaptors 11 on the right side of the vehicle 31 would be rotated counter-clockwise, and wheel hub adaptors 11 on the left side of the vehicle 31 would be rotated clockwise.

It will be understood that in an alternative embodiment, the centre of the inner mounting plate extending between adjacent stop portions 35 could be excised in order to accommodate oversize vehicle hubs, in which case the apertures 17 would become recesses with the clearance voids being semi circular and the stop portions also being quarter circles at either end of each recess.

As can be seen, the inner mounting plate 11 apertures 17 are arranged in the form of slot shaped apertures each with a stop portion 35 at opposed ends thereof, with the circular clearance void 37 located substantially equidistant from the opposed stop portions 35, in an arrangement that can be likened to a double keyhole. The wheel hub adaptor 11 is fitted by aligning the clearance voids 37 with the heads 39 of the fasteners 32, inserting the wheel hub adaptor along the heads 39 so that the inner mounting plate fastener engaging portions formed by the narrowed portions of the apertures 17 reach the circumferential grooves 33, and then rotating the wheel hub adaptor 11 to lock it in position against a stop portion 35. For each slot shaped aperture 17, a narrowed portion 41 of the slot 17 slidingly engages with the circumferential groove 33 of a fastener 32, until the slot shaped aperture 41 reaches the stop portion 35, against which it is restrained.

The inner mounting plate features two spaced apart circular apertures 43 and 45 arranged to receive a threaded bolt 47 which passes through one of these circular apertures 43 and 45, to secure to a second fastener 49. The second fastener 49 and threaded bolt 47 form the two part fastener which is illustrated in FIGS. 7 to 10. The second fastener 49 has a length equal to the length from the inner face 50 of the grooves 33 of the fasteners 32, so that the top 51 of the second fastener 49 will rest against the vehicle wheel 13 side 53 of the inner mounting plate 15. The second fastener 49 is used to secure the vehicle wheel 13 to the remaining stud. Thus each vehicle wheel 13 is secured to its hub by one second fastener 49 and the rest of the studs receiving a fastener 32. The present embodiment shows fitting to a vehicle 31 having six wheel nuts to secure the wheel 13, requiring one second fastener 49 and five fasteners 32.

The second fastener 49 has a female thread 55 to mate with the male thread 57 of the bolt 47. This is used to secure the vehicle hub adaptor 11 between the bolt 47 and the second fastener 49.

Figure 20:
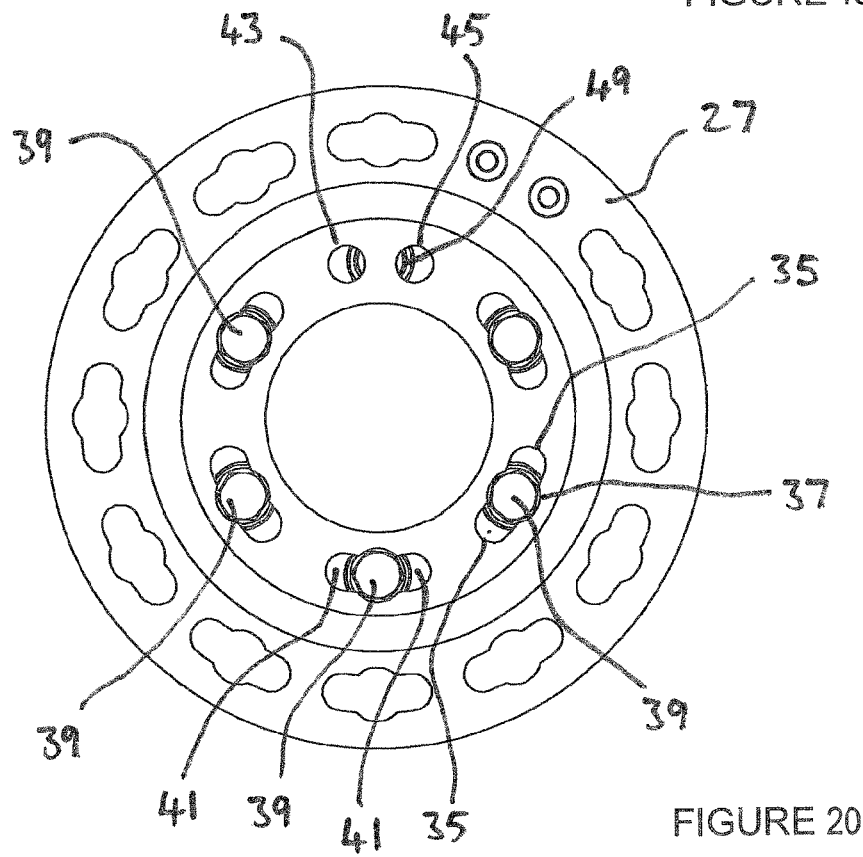
Figure 21:
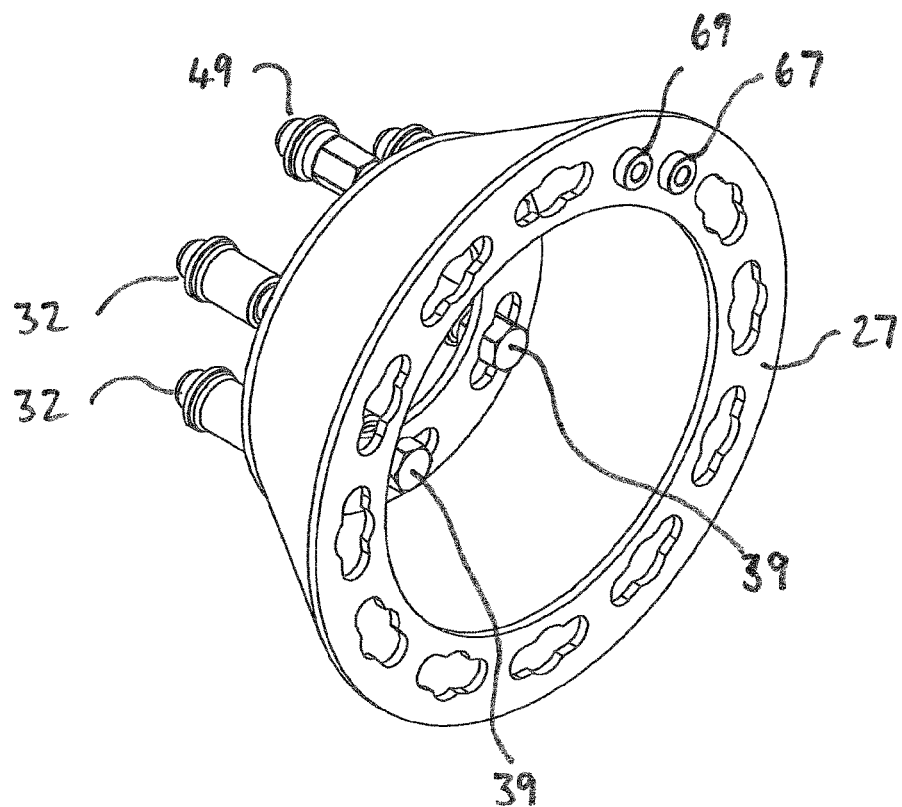
FIGS. 21 to 24 are close up views of detail showing one of the vehicle hub adaptors being fitted to the vehicle.
Figure 22:
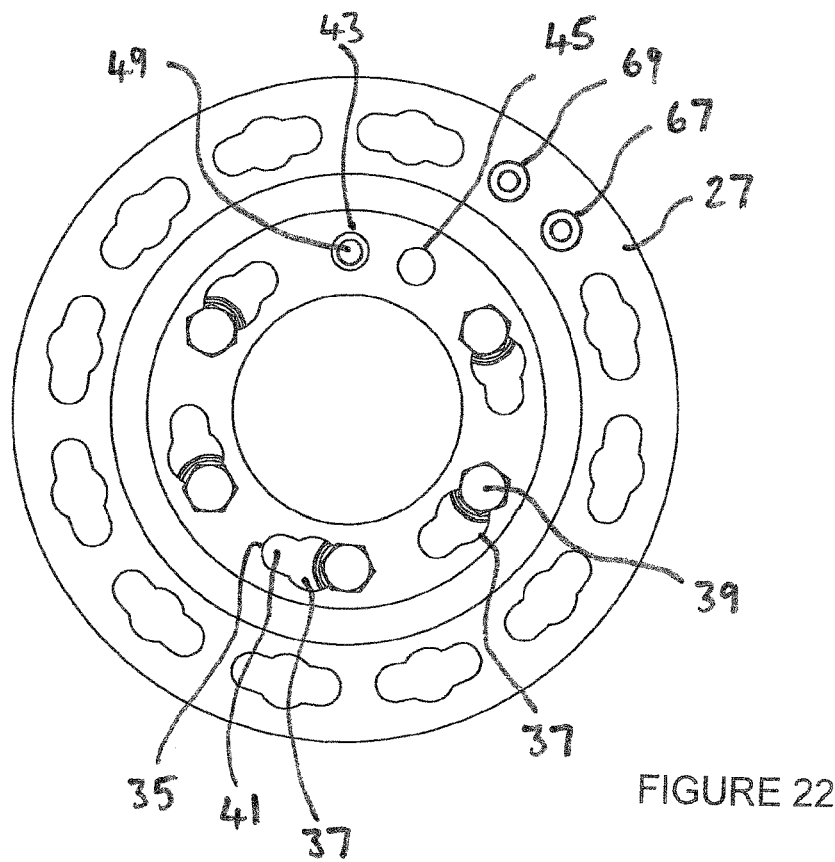
Figure 23:
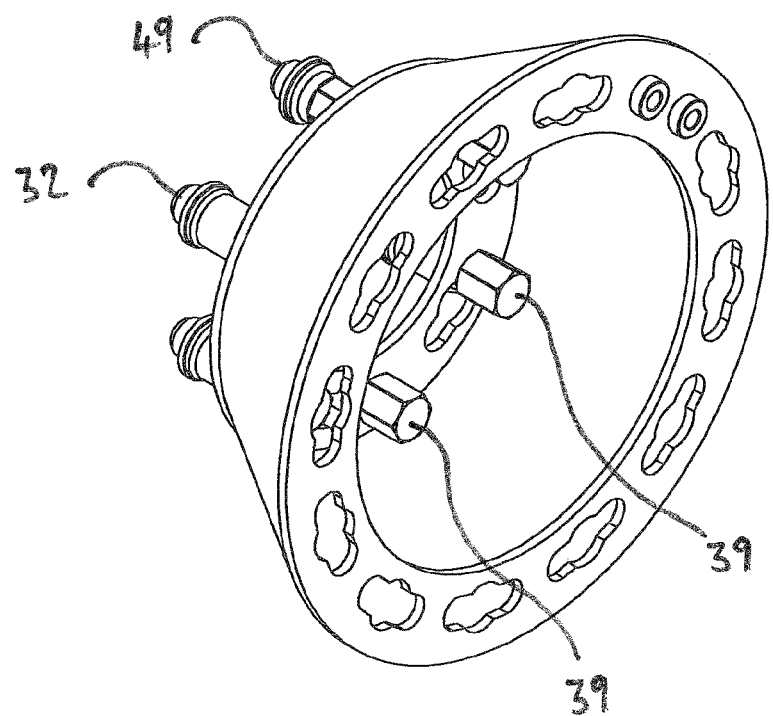
Figure 24:
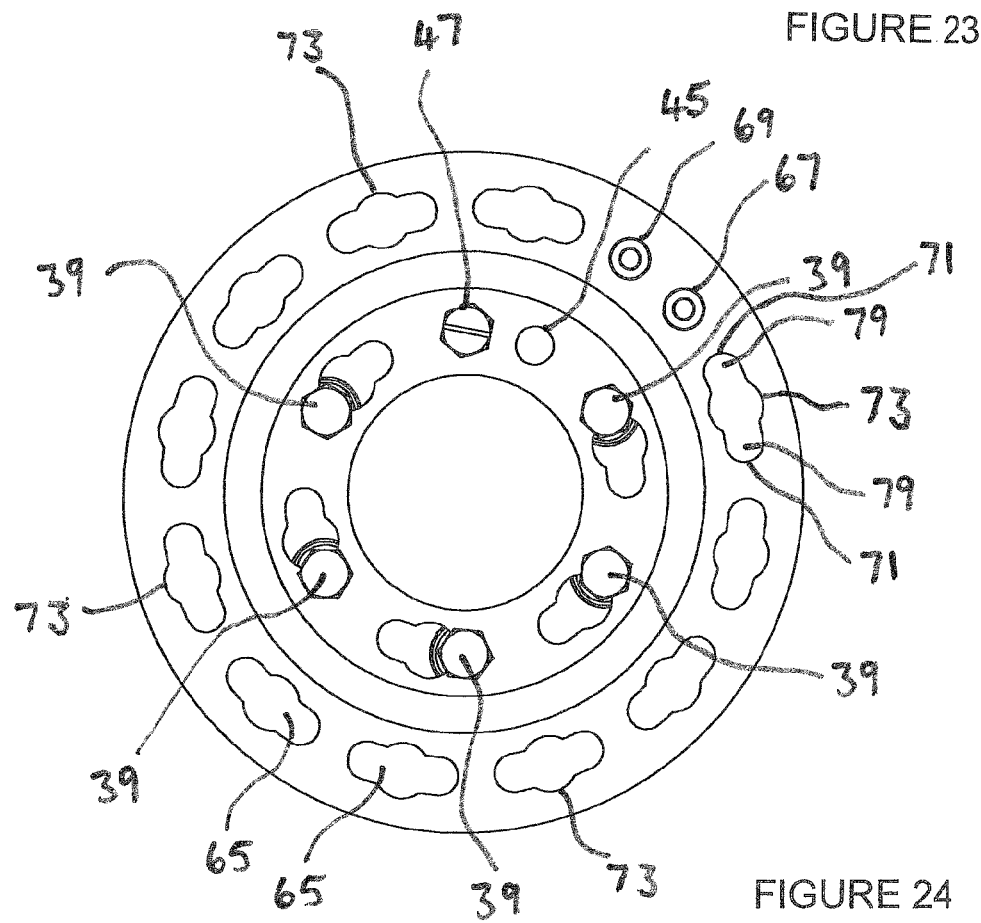
Figure 25:
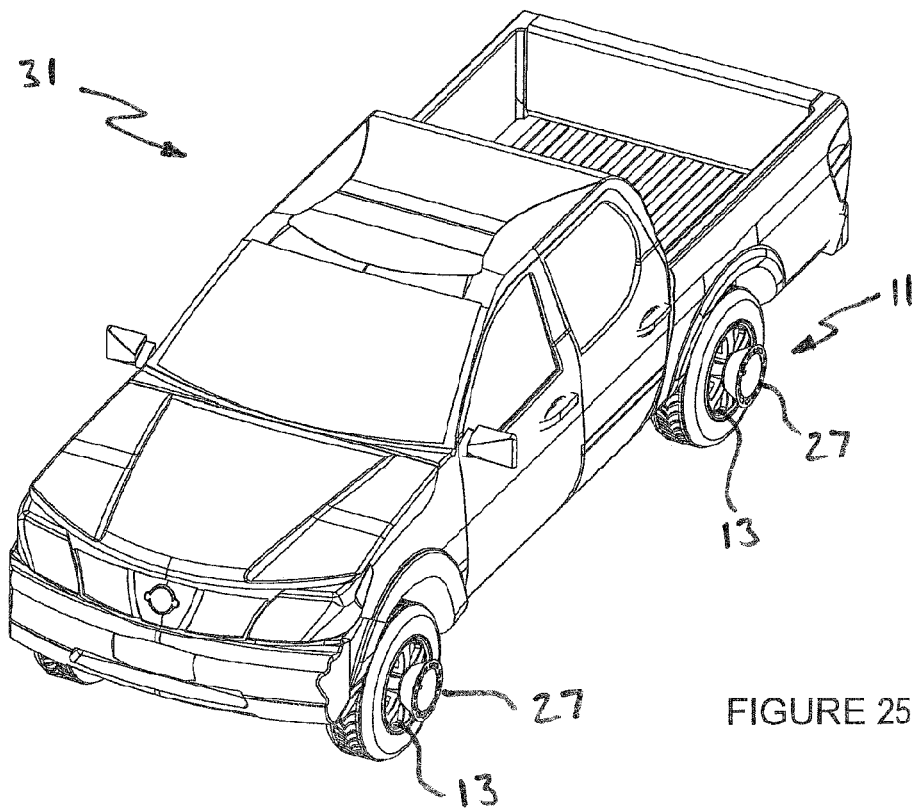
FIG. 25 is a perspective view showing the vehicle of FIG. 17 with two vehicle hub adaptors fitted.
Figure 26:
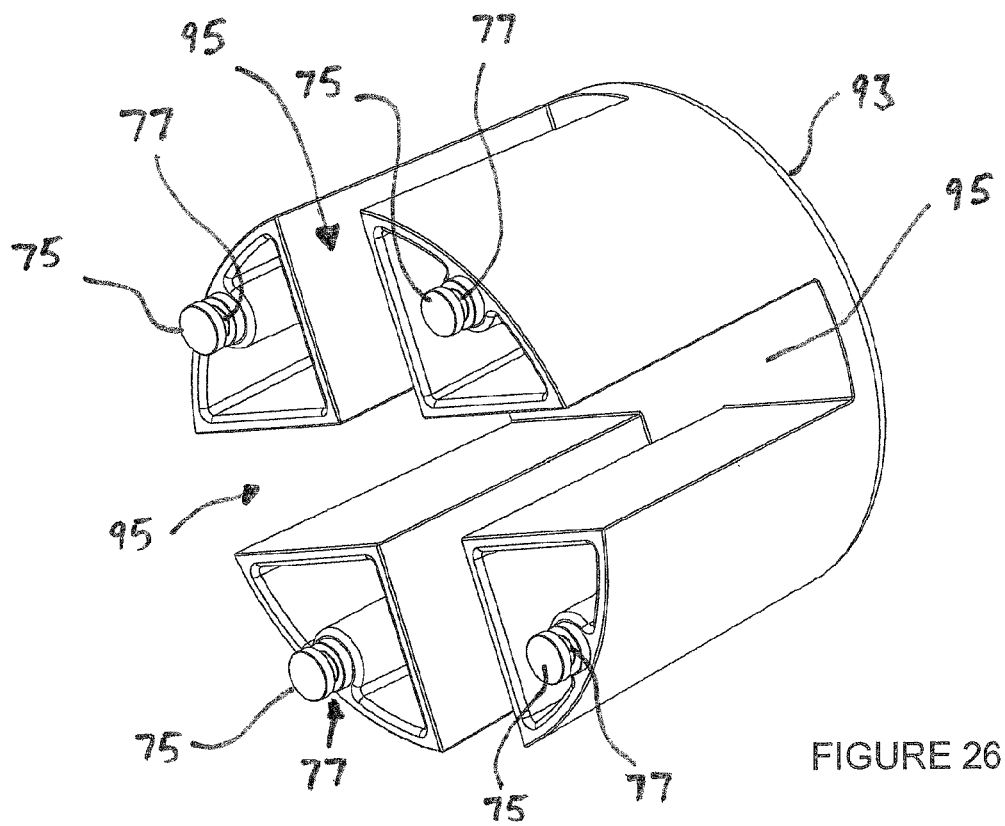
FIG. 26 is a close-up perspective view of a part of a vehicle accessory according to a first embodiment, which is attached to a hub adaptor.
Figure 27:
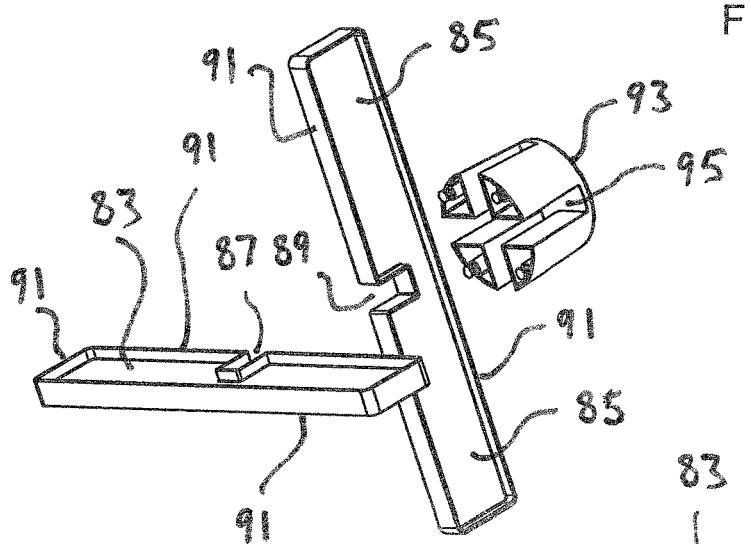
FIGS. 27 to 30 are views of a vehicle accessory of the first embodiment, in the form of sand paddles which are fitted to vehicle hub adaptors and used to provide traction in soft sand.
Figure 28:
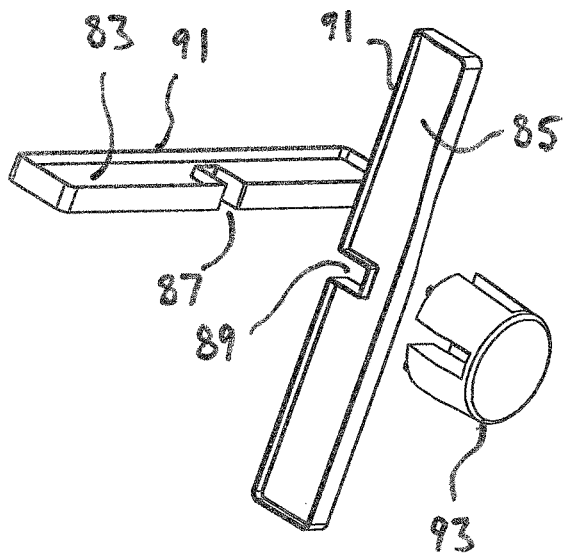
Figure 29:
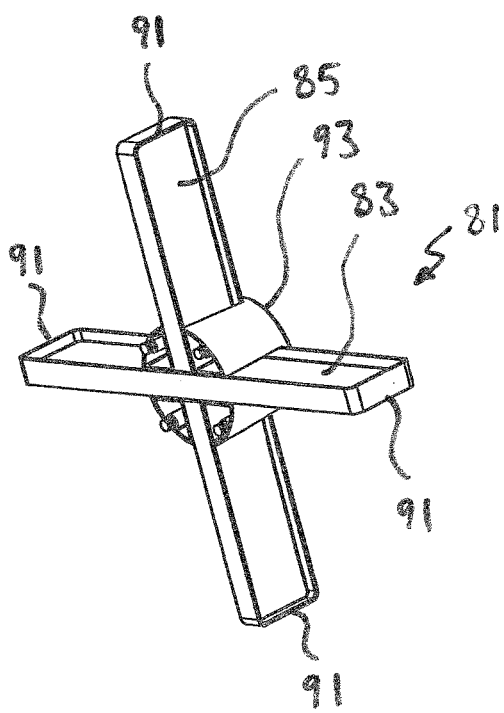
Figure 30:
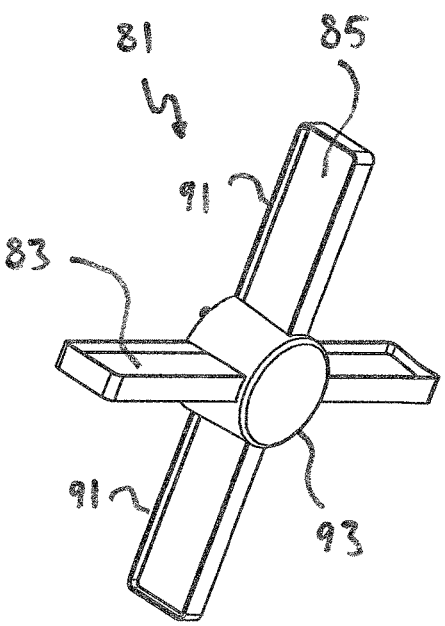
Figure 31:
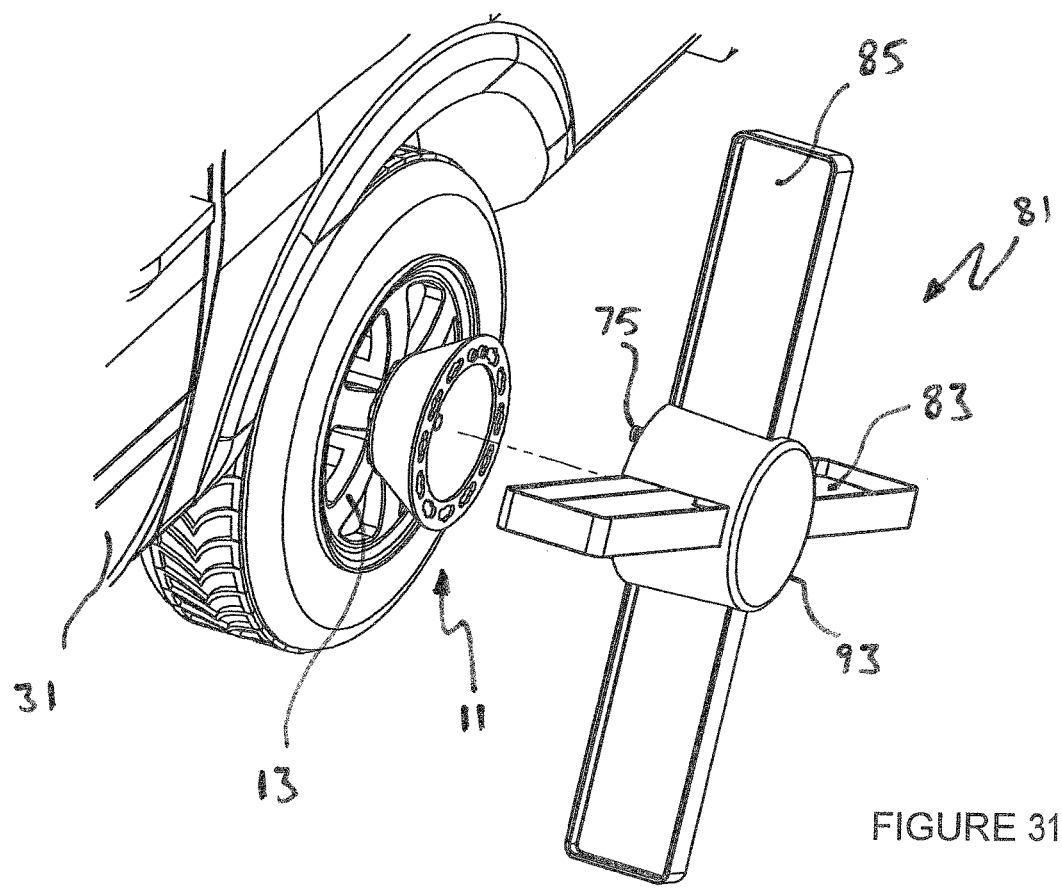
FIG. 31 is a close up perspective view showing the vehicle accessory of the first embodiment, in the form of sand paddles, being fitted to a vehicle wheel hub adaptor fitted to the rear wheels of a vehicle.
Figure 32:
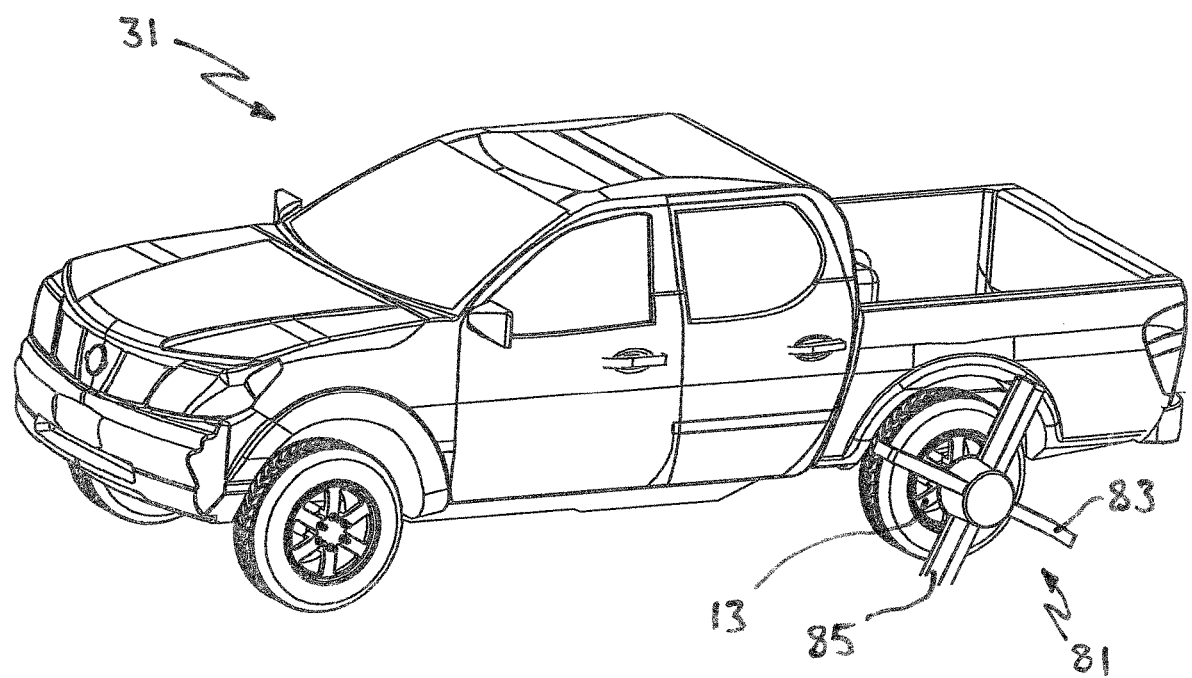
FIG. 32 is a perspective view showing the arrangement in FIG. 31, in use.
Figure 39:
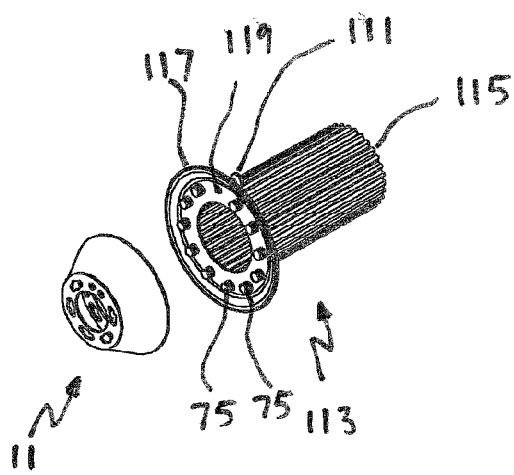
FIGS. 39 to 41 are views of a vehicle accessory according to a third embodiment, which is fitted to a vehicle hub adaptor.
Figure 40:
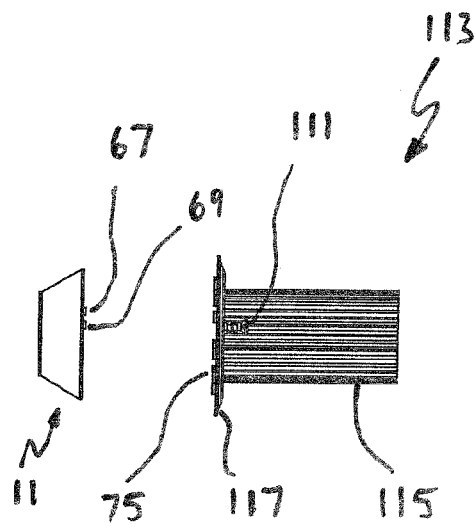
Figure 41:
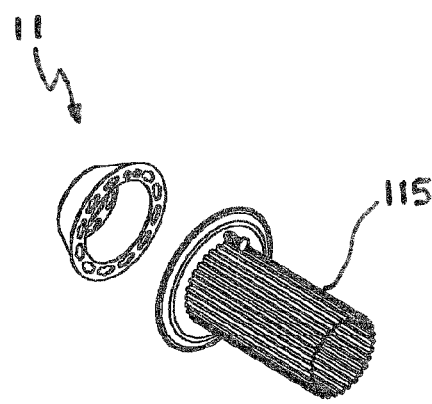
Figure 44:
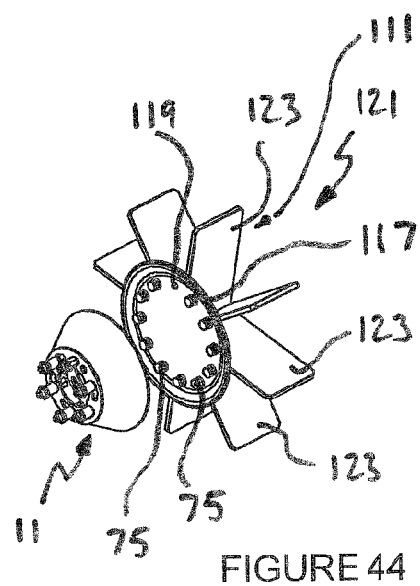
FIGS. 44 and 45 are views of a vehicle accessory according to a fourth embodiment, which is fitted to a vehicle hub adaptor.
Figure 45:
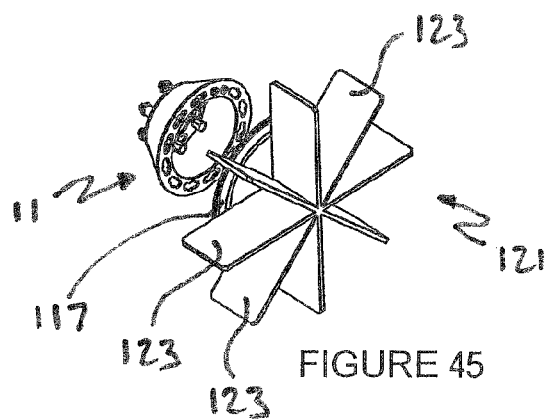
Figure 42:
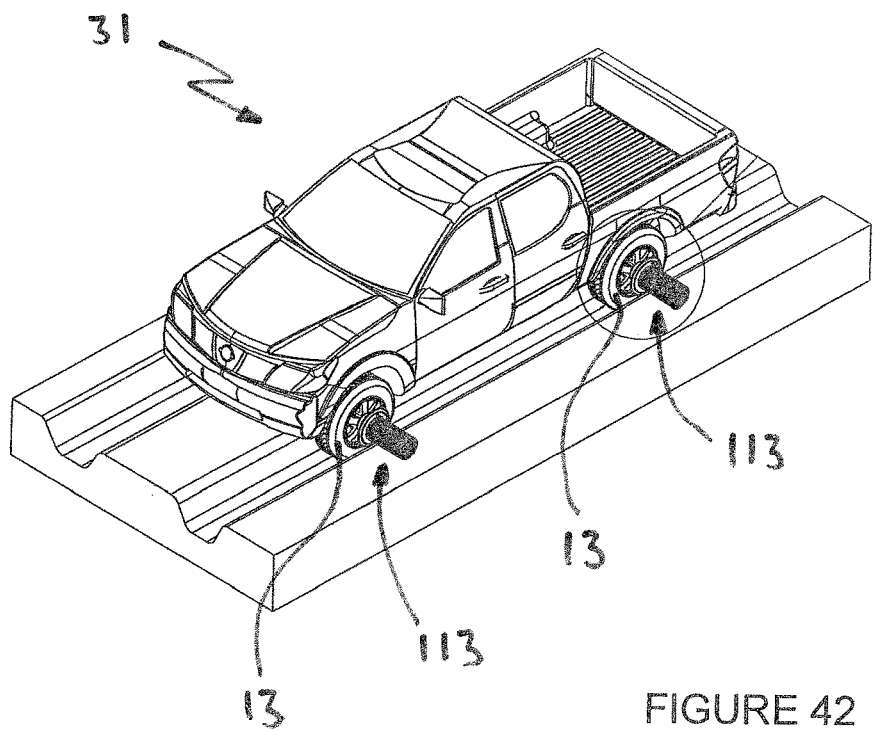
FIG. 42 is a perspective view showing the third embodiment illustrated in FIGS. 39 to 41, in use.
Figure 43:
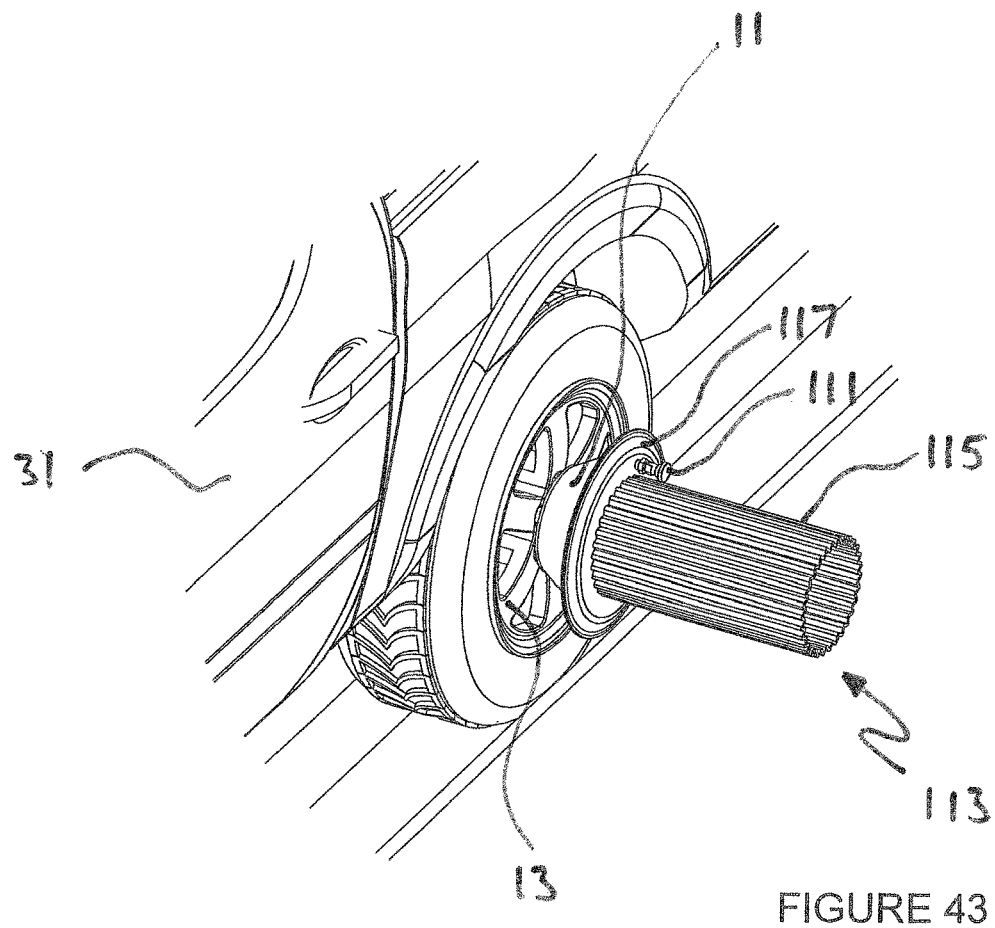
FIG. 43 is a close up of detail of part of FIG. 42.

To fit the vehicle hub adaptor 11, it is aligned so that the fasteners 32 all line up with a circular clearance void 37 of an aperture 17, as shown in FIG. 20. The vehicle hub adaptor 11 is slid along the heads 39 until the narrowed portions 35 align with the circumferential slot 33 and the top of the second fastener 49 rests against the side 53 of the inner mounting plate 15.

When the wheel hub adaptor 11 is rotated to lock it in position, one of the circular apertures 43 and 45 will align with the female thread 55 of the second fastener 49, so that the bolt can pass through to secure the wheel hub adaptor to the wheel of the vehicle. Rotation of the vehicle hub adaptor 11 anti-clockwise will align the female thread 55 and aperture 43 and rotation clockwise will align the female thread 55 and aperture 45. The bolt 47 is fitted through the selected aperture 43 or 45 and tightened.

Figure 14:
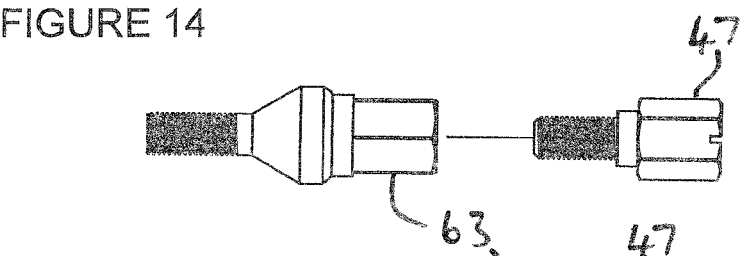
FIGS. 14 and 15 are views of an alternative two-part fastener intended to be employed to attach a vehicle wheel hub adaptor according to either embodiment.
Figure 15:
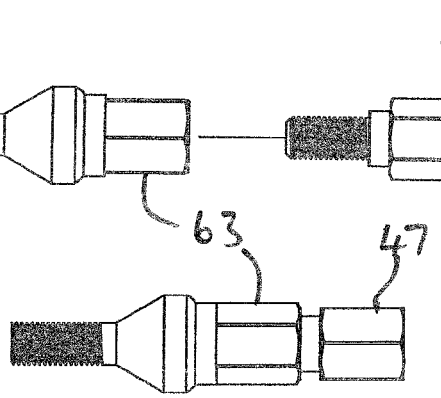

The fastener 32 and second fastener 49 are intended for vehicles having wheel nuts to secure their wheels 13. Some vehicles have bolts securing their wheels to their hubs, and a bolt-type fastener 61 as shown in FIG. 16 and a second bolt-type fastener 63 as shown in FIGS. 14 and 15 can substitute for the fastener 32 and second fastener 49 respectively, for such vehicles.

The outer mounting plate 27 has a mount to attach a vehicle accessory, the vehicle accessory has a mating mount to attach to the mount of the mounting plate 27.

The mount of the outer mounting plate 27 comprises eleven spaced apart mount apertures 65 of the same style as the apertures 17 in the inner mounting plate 15, and two female threaded bosses 67 and 69. The mount apertures 65 are slot shaped with an end portion 71 at opposed ends thereof, and with a stud clearance void 73 located equidistant from said opposed end portions 71.

The mating mount comprising a plurality of studs 75 that may be aligned with the stud clearance voids 73, each of the studs 75 having a circumferential annular recess 77 of width commensurate with the thickness of the plate forming the outer mounting plate 27, to receive a slot portion 79 up to and contacting an end portion 71 of a mount aperture 65 when locking the vehicle accessory to said outer mounting plate 27. As will be understood the fitting of the vehicle accessory to the outer mounting plate 27 is in the same manner as the fitting of the inner mounting plate 15 to the fasteners 32 and in the same direction. The female threaded bosses 67 and 69 are not utilised in all fitted vehicle accessories.

The vehicle accessory is fitted to the outer mounting plate by aligning the studs 75 with the stud clearance voids 73, inserting the vehicle accessory along the studs so that the circumferential annular recesses meet the slots 79 in the mount apertures 65, and then rotating the vehicle accessory to lock it in position against one of the end portions 71, depending on the direction of rotation. For each mount aperture, a portion of the slot 79 edge slidingly engages with a circumferential annular recess of a stud, until the slot 79 reaches the end portion 71, against which it is restrained. As with the previously described arrangement, the action of locking in position can be likened to a bayonet mount. Also as with the previously described arrangement, the direction that the vehicle accessory is rotated relative to the wheel hub adaptor and vehicle wheel is dictated by the direction that the vehicle accessory will be loaded when the vehicle is under power. Thus for a vehicle moving forward, to lock the vehicle accessory in position, vehicle accessories on the right side of the vehicle would be rotated counter-clockwise, and vehicle accessories on the left side of the vehicle would be rotated clockwise.

Figure 4:
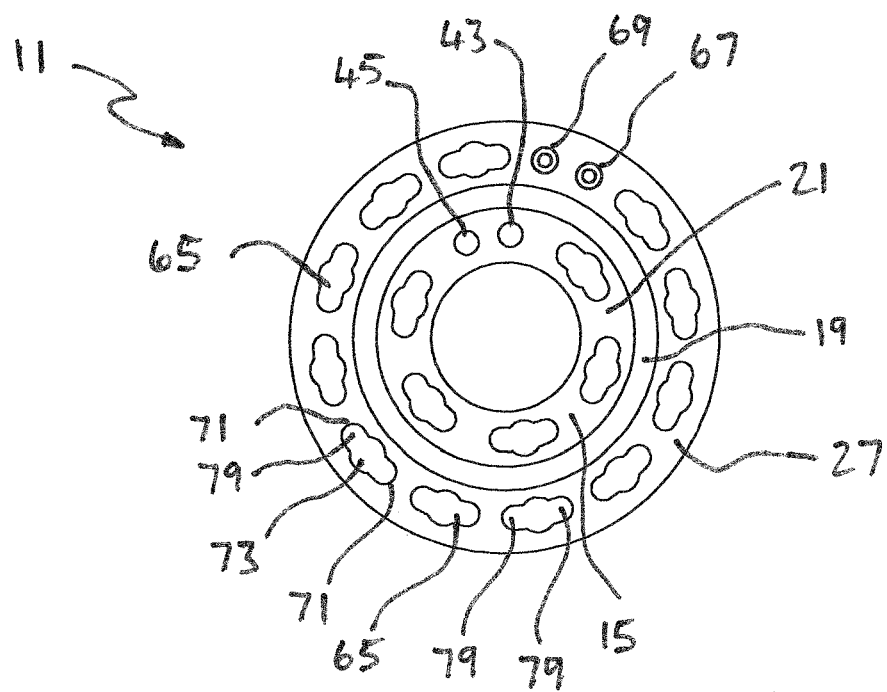
FIG. 4 is a front plan view of the vehicle wheel hub adaptor of FIG. 1.
Figure 4A:
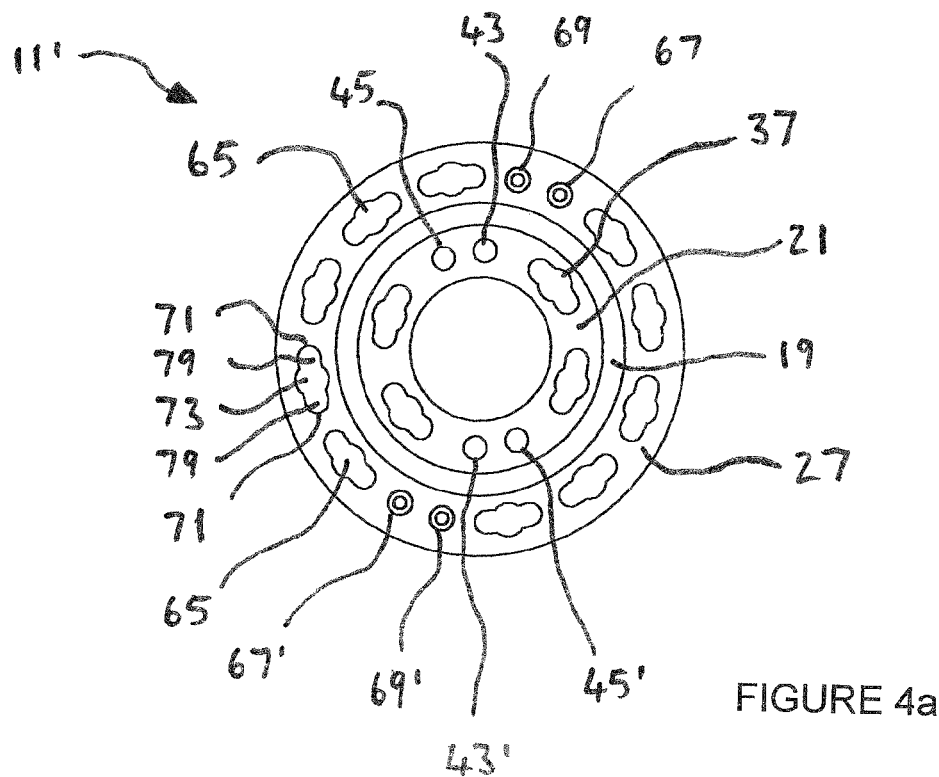
FIG. 4*a* is a front plan view of a vehicle wheel hub adaptor of an alternative embodiment to that shown in FIGS. 1 to 4.
Figure 33A:
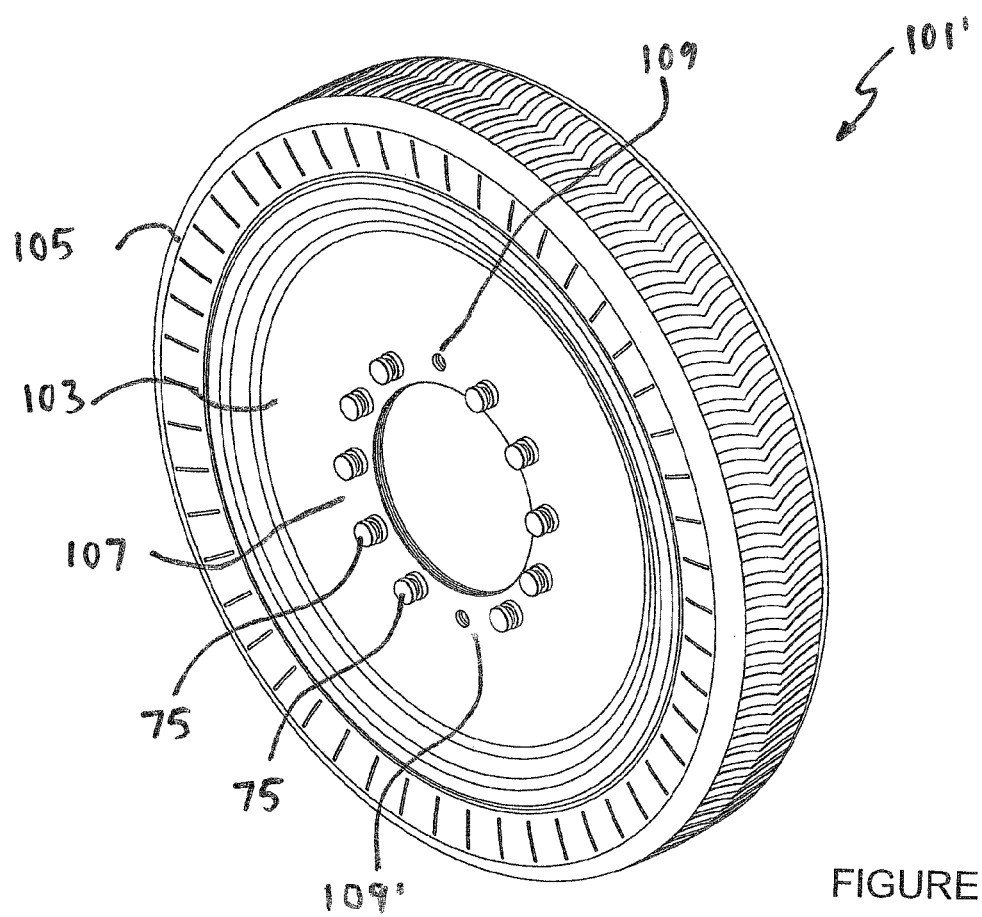
FIG. 33*a* is a perspective view of a vehicle accessory according to an alternative second embodiment, being an additional wheel which is fitted to the alternative vehicle hub adaptor illustrated in FIG. 4*a*.
Figure 9:
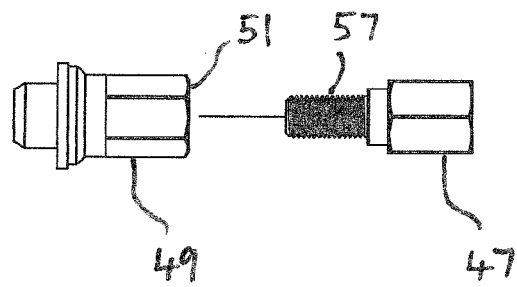
Figure 10:
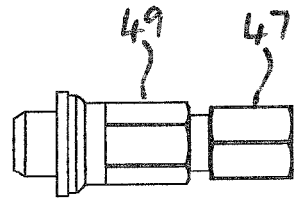
Figure 13:
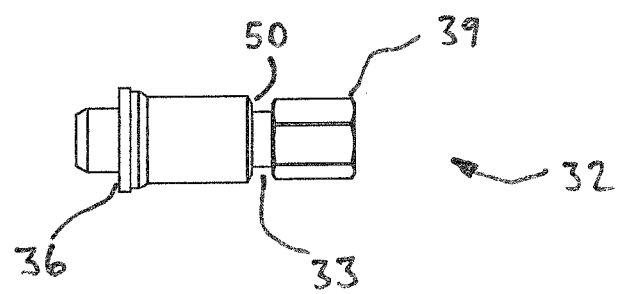

An alternative embodiment of the wheel hub adaptor 11' is illustrated in FIG. 4a. This alternative embodiment is similar to the wheel hub adaptor 11 shown in FIG. 4, but has two further spaced apart circular apertures 43' and 45' arranged to receive a further threaded bolt 47 which passes through one of these circular apertures 43' and 45', to secure to a further second fastener 49. The two further spaced apart circular apertures 43' and 45' are located opposite the circular apertures 43 and 45, and functionally to secure to a second fastener 49 in the same manner. The provision of the two further spaced apart circular apertures 43' and 45' provides additional security to the fitting of the wheel hub adaptor. The wheel hub adaptor of this alternative embodiment also has two further female threaded bosses 67' and 69', the function of which will be discussed later.

Referring to FIGS. 26 to 32, a first embodiment being a sand paddle 81 is illustrated. The sand paddle 81 comprises a pair of orthogonal interleaved arms 83 and 85, each arm having a central slot 87 and 89 respectively, so that the assembly arms 83 and 85 join in a cross-lapped manner. The edges of the arms 83 and 85 are formed with flanges 91 which are integrally welded thereto. The cross lapped join of the arms 83 and 85 is housed within a cap 93 having a cross shaped recess 95 to accommodate the cross lapped arms 83 and 85. Mounted on the inside of the cap 93 are four studs 75 each having a circumferential annular recess 77, to which the assembled sand paddle 81 is fitted to four of the outer mounting plate 27 mount apertures 65, of the wheel hub adaptor 11, and locked in place, bayonet style, as described above, as illustrated in FIG. 32. The sand paddles 81 are fitted to each side of the rear axle of the vehicle and are used to provide traction in soft sand, where a vehicle might otherwise become bogged.

Referring to FIGS. 33 to 38, a second embodiment being an additional wheel 101 to provide a dual wheel configuration (commonly referred to as a dually) is illustrated. The additional wheel 101 comprises a rim 103 and tyre 105. Mounted on the inside 107 of the rim 103 are eleven studs 75 each having a circumferential annular recess 77, to which the assembled additional wheel 101 is fitted to all of the outer mounting plate 27 mount apertures 65, of the wheel hub adaptor 11, and locked in place, bayonet style, as described above, as illustrated in FIG. 38. An aperture 109 is provided in a position where a twelfth stud might have been provided, and a bolt 111 passes through the aperture 109 and is received in one of the two female threaded bosses 67 and 69, whichever is aligned by the bayonet fitting of the additional wheel 101 via its studs 75 fitting in the apertures 65. Where a wheel hub adaptor 11' according to the alternative embodiment shown in FIG. 4a is utilised, a further aperture 109' the same as that shown as aperture 109, but located opposite aperture 109 in the position where the sixth stud would have been provided, is provided in an alternative second embodiment of the additional wheel 101', shown in FIG. 33a. A further bolt 111 passes through that additional aperture 109' into one of the two further female threaded bosses 67' and 69', whichever is aligned by the bayonet fitting of the additional wheel 101 via its studs 75 fitting in the apertures 65.

When the additional wheel 101 is rotated to lock it in position, one of the two threaded bosses 67 or 69 will align with the aperture 109 of the additional wheel so that the bolt 111 can be fitted and tightened. With the wheel hub adaptor 11' according to the alternative embodiment shown in FIG. 4a, when the additional wheel 101 is rotated to lock it in position, one of the two threaded bosses 67' or 69' will also align with the further aperture 109' of the additional wheel so that the further bolt 111 can also be fitted and tightened. The additional fixing of the wheel 101' to the wheel hub adaptor 11' shown in FIG. 4a, would provide additional security for applications where it might be considered that securing with a single bolt might be insufficient.

An additional wheel 101 can be fitted to each side of the front axle of the vehicle and used to provide additional traction, or a single additional wheel may be used to provide emergency support where an existing tyre has a puncture, for example.

Referring to FIGS. 39 to 43, a third embodiment being a reduced diameter wheel 113 is illustrated. The reduced diameter wheel 113 corrugated steel cylinder 115 with axially extending corrugations extending all around its cylindrical surface. The corrugated steel cylinder 115 is welded to a mating mount in the form of an annular disk 117. Mounted on the inside of the annular disk 117, extending away from the corrugated steel cylinder 115, are eleven studs 75 each having a circumferential annular recess 77, to which the reduced diameter wheel 113 is fitted to all of the outer mounting plate 27 mount apertures 65, of the wheel hub adaptor 11, and locked in place, bayonet style, as described above, as illustrated in FIGS. 42 and 43. An aperture 119 is provided in a position where a twelfth stud might have been provided, and a bolt 111 passes through the aperture 109 and is received in one of the two female threaded bosses 67 and 69, whichever is aligned by the bayonet fitting of the additional wheel 101 via its studs 75 fitting in the apertures 65. When the reduced diameter wheel 113 is rotated to lock it in position, one of the two threaded bosses 67 or 69 will align with the aperture 109 of the additional wheel so that the bolt 111 can be fitted and tightened. A reduced diameter wheel 113 is fitted to each wheel the vehicle and these are used to provide additional traction, on deeply rutted tracks (see FIG. 42) where the vehicle would otherwise bottom out due to the depth of wheel ruts in the track being too deep for the vehicle to traverse. These deeply rutted tracks generally occur in clay, and are formed by vehicles traversing the track while the clay is wet. When the clay dries, the ruts remain, and provide an obstacle to any four wheel drive recreational vehicle not having sufficient ground clearance. In these circumstances the corrugated steel cylinder 115 of the reduced diameter wheel 113 contacts hard ground outside the ruts, and provides traction for the vehicle. The corrugations of the corrugated steel cylinder 115 engage the tops of ground beside the ruts before the vehicle bottoms out. The vehicle wheels continue to rotate but the vehicle advances on the reduced diameter wheels 113. Being smaller diameter than the vehicle wheels, the reduced diameter wheels 113 move the vehicle more slowly but with greater traction due to the lower 'gearing'.

The corrugated steel cylinder 115 of the reduced diameter wheel 113 is of overall diameter of about one fifth of the diameter of the vehicle wheel to which the hub adaptor is attached, and has a width of between 2 and 3 times greater than its diameter. This arrangement allows a temporary fitting to wheels of a vehicle which can assist the vehicle in traversing deeply rutted tracks. The reduced diameter wheel 113 extends beyond the ruts and contacts higher ground on the outside of the ruts, affording continued traction to the vehicle in a situation where the vehicle might otherwise lose traction and bottom out.

Referring to FIGS. 44 to 47, a fourth embodiment being an alternative sand paddle 121 is illustrated. The sand paddle 121 comprises eight blades 123 welded to a mating mount in the form of an annular disk 117. Mounted on the inside of the annular disk 117, extending away from the corrugated steel cylinder 115, are eleven studs 75 each having a circumferential annular recess 77, to which the reduced diameter wheel 113 is fitted to all of the outer mounting plate 27 mount apertures 65, of the wheel hub adaptor 11, and locked in place, bayonet style, as described above, as illustrated in FIGS. 42 and 43. An aperture 119 is provided in a position where a twelfth stud might have been provided, and a bolt 111 passes through the aperture 109 and is received in one of the two female threaded bosses 67 and 69, whichever is aligned by the bayonet fitting of the sand paddle 121 via its studs 75 fitting in the apertures 65. When the sand paddle 121 is rotated to lock it in position, one of the two threaded bosses 67 or 69 will align with the aperture 109 of the sand paddle 121 so that the bolt 111 can be fitted and tightened. The sand paddles 121 are fitted to each side of the rear axle of the vehicle and are used to provide traction in soft sand, where a vehicle might otherwise become bogged.

Some or all of the embodiments may be provided as a kit of components for purchase and use by four wheel drive enthusiasts, comprising vehicle wheel hub adaptors 11, and components for one or more of the four embodiments described. The vehicle wheel hub adaptors may differ in the configuration of the inner mounting plate 17 in order to match vehicle wheel stud patterns of different vehicles, but the outer mounting plates 27 can be identical in configuration, which will allow owners to swap vehicle accessories.

It will be appreciated that the scope of the invention is not limited to the embodiments described herein, and that a person skilled in the art will appreciate that changes may be made without departing from the spirit and scope of the invention.

The claims defining the invention are as follows:

1. A wheel hub adaptor to attach to a vehicle wheel to attach a vehicle accessory for rotation with said vehicle wheel, said wheel hub adaptor having an inner mounting plate having a plurality of recesses or apertures to match a wheel stud pattern of a wheel for a vehicle with which said adaptor is to be employed, a structural body extending from said inner mounting plate from a side thereof opposite to said wheel, to an outer mounting plate, said outer mounting plate being securable with said vehicle accessory in order to mount the vehicle accessory to the wheel hub adaptor;

wherein the outer mounting plate has a mount to attach said vehicle accessory, said vehicle accessory having a mating mount to attach to said mount;

wherein the mount comprises a plurality of spaced apart mount apertures being slot shaped with an end portion at opposed ends thereof, and with a stud clearance void located substantially equidistant from said opposed end portions;

said mating mount comprising a plurality of studs aligned with said stud clearance voids, each of said studs having a circumferential stepped recess to receive a slot portion of a said mount aperture when locking said vehicle accessory to said outer mounting plate; and wherein the mount features two spaced apart circular threaded apertures, and the mating mount features a single aperture, where said single aperture will align with one of said threaded apertures at extremes of rotation of said mating mount relative to said mount, and a threaded fastener is provided to secure said single aperture to one of said two spaced apart apertures, to secure said vehicle accessory to said wheel hub adaptor.

2. The wheel hub adaptor as claimed in claim 1, wherein said inner mounting plate of said wheel hub adaptor is arranged to engage with a plurality of fasteners each provided with a circumferential groove having a radial depth sufficient to provide purchase to stop portions of said inner mounting plate.

3. The wheel hub adaptor as claimed in claim 1, wherein the inner mounting plate has said recesses or apertures arranged with a clearance void to accommodate passage of a plurality of fasteners, to allow the fitting or removal of said wheel hub adaptor.

4. The wheel hub adaptor as claimed in claim 1, wherein the inner mounting plate has said recesses or apertures arranged in the form of slot shaped apertures each with a stop portion at opposed ends thereof, with said clearance void located substantially equidistant from said opposed stop portions of each said slot shaped aperture to accommodate passage of a plurality of fasteners, to allow the fitting or removal of said wheel hub adaptor.

5. The wheel hub adaptor as claimed in claim 1, wherein the inner mounting plate features two spaced apart circular apertures arranged to receive a threaded bolt which passes through one said circular aperture, to secure to a second fastener having a female thread to mate with said bolt.

6. The wheel hub adaptor as claimed in claim 1, wherein the mount features two further spaced apart circular threaded apertures located diametrically opposite said two spaced apart circular threaded apertures, and the mating mount features a single further aperture located diametrically opposite said single aperture, where said single further aperture will align with one of said two further spaced apart circular threaded apertures at extremes of rotation of said mating mount relative to said mount, and a threaded fastener is provided to secure said single further aperture to one of said two further spaced apart apertures, to secure said vehicle accessory to said wheel hub adaptor.

7. A wheel hub adaptor to attach to a vehicle wheel to attach a vehicle accessory for rotation with said vehicle wheel, said wheel hub adaptor having an inner mounting plate having a plurality of elongate recesses or apertures having a centrally located clearance void to match a wheel stud pattern of said vehicle wheel for a vehicle with which said adaptor is to be employed and to allow passage of fasteners therethrough, said elongate recesses or apertures having a stop portion at each end thereof opposed from said clearance void;

said wheel hub adaptor having a structural body extending from said inner mounting plate from a side thereof opposite to said wheel, to an outer mounting plate, said outer mounting plate being securable with said vehicle accessory in order to mount the vehicle accessory to the wheel hub adaptor;

wherein said inner mounting plate of said wheel hub adaptor is arranged to engage with a plurality of fasteners used to secure said vehicle wheel, each of said fasteners being provided with a circumferential groove having a radial depth sufficient to accommodate at least a part of said elongate recesses or apertures and to provide purchase to a said stop portion;

wherein the inner mounting plate features two spaced apart circular apertures arranged to receive a threaded bolt which at extremes of rotation of said wheel hub adaptor relative to said vehicle wheel passes through one said circular aperture, to secure to a second fastener, said second fastener being used to secure said vehicle wheel and having a female thread to mate with said bolt;

wherein the outer mounting plate has a mount to attach said vehicle accessory, said vehicle accessory having a mating mount to attach to said mount, wherein the mount features two spaced apart circular threaded apertures, and the mating mount features a single aperture, where said single aperture will align with one of said threaded apertures at extremes of rotation of said mating mount relative to said mount, and a threaded fastener is provided to secure said single aperture to one of said two spaced apart apertures, to secure said vehicle accessory to said wheel hub adaptor.

8. The wheel hub adaptor as claimed in claim 7, wherein the inner mounting plate has said recesses or apertures arranged in the form of slot shaped apertures each with a said stop portion at opposed ends thereof, with said clearance void located substantially equidistant from said opposed stop portions of each said slot shaped aperture to accommodate passage of said fasteners, to allow the fitting or removal of said wheel hub adaptor.

9. The wheel hub adaptor as claimed in claim 7, wherein the inner mounting plate features two further spaced apart circular apertures located diametrically opposite said two spaced apart circular apertures and arranged to receive a further threaded bolt which passes through one said circular aperture, to secure to a further second fastener, said further second fastener being used to secure said vehicle wheel and having a female thread to mate with said bolt.

10. The wheel hub adaptor as claimed in claim 7, wherein the mount comprises a plurality of spaced apart mount apertures being slot shaped with an end portion at opposed ends thereof, and with a stud clearance void located substantially equidistant from said opposed end portions; said mating mount comprising a plurality of studs aligned with said stud clearance voids, each of said studs having a circumferential stepped recess to receive a said slot portion of a said mount aperture when locking said vehicle accessory to said outer mounting plate.

11. The wheel hub adaptor as claimed in claim 7, wherein the mount features two further spaced apart circular threaded apertures located diametrically opposite said two spaced apart circular threaded apertures, and the mating mount features a single further aperture located diametrically opposite said single aperture, where said single further aperture will align with one of said two further spaced apart circular threaded apertures at extremes of rotation of said mating mount relative to said mount, and a threaded fastener is provided to secure said single further aperture to one of said two further spaced apart apertures, to secure said vehicle accessory to said wheel hub adaptor.

12. The wheel hub adaptor as claimed in claim 1, wherein said inner mounting plate has an annular configuration.

13. The wheel hub adaptor as claimed in claim 1, wherein said structural body is cylindrical in configuration, attaching to or next to an outer circumference of said inner mounting plate.

14. The wheel hub adaptor as claimed in claim 1, wherein said outer mounting plate has an annular configuration.

15. The wheel hub adaptor as claimed in claim 1, wherein said outer mounting plate has a larger diameter than said inner mounting plate.

16. The wheel hub adaptor as claimed in claim 1, wherein said structural body is frustro-conical in configuration and a narrower diameter thereof attaches to or next to an outer circumference of said inner mounting plate, and a wider diameter thereof attaches to or next to an outer circumference of said outer mounting plate.

17. A vehicle accessory in the form of a paddle arrangement having a plurality of paddles located circumferentially around a hub, said hub being securable to the outer mounting plate of the wheel hub adaptor according to claim 1.

18. A vehicle accessory in the form of a paddle arrangement having a plurality of paddles located circumferentially around a hub, said hub being securable to the outer mounting plate by the mating mount of the wheel hub adaptor according to claim 1, the mating mount being located radially on said hub at one end thereof.

* * * * *